(12) United States Patent
Stevens

(10) Patent No.: US 7,200,837 B2
(45) Date of Patent: Apr. 3, 2007

(54) SYSTEM, METHOD AND SOFTWARE FOR STATIC AND DYNAMIC PROGRAMMING AND CONFIGURATION OF AN ADAPTIVE COMPUTING ARCHITECTURE

(75) Inventor: Cameron Stevens, Bainbridge Island, WA (US)

(73) Assignee: QST Holdings, LLC, Palo Alto, CA (US)

( * ) Notice: Subject to any disclaimer, the term of this patent is extended or adjusted under 35 U.S.C. 154(b) by 785 days.

(21) Appl. No.: 10/645,269

(22) Filed: Aug. 21, 2003

(65) Prior Publication Data

US 2005/0044344 A1  Feb. 24, 2005

(51) Int. Cl.
G06F 9/44 (2006.01)
G06F 17/50 (2006.01)

(52) U.S. Cl. .................. 717/114; 717/115; 717/117; 716/1; 716/8; 716/11; 716/17

(58) Field of Classification Search ........ 717/114–119; 716/1, 8, 11, 17
See application file for complete search history.

(56) References Cited

OTHER PUBLICATIONS

"IEEE Standard Verilog hardware Description Language", Sep. 2001, IEEE downloaded from 'http://inst.eecs.berkeley.edu/~cs150/fa06/Labs/verilog-ieee.pdf' on Dec. 7, 2006.*

Ashenden "The VHDL CookBook", Jul. 1990, Dept. Computer Science University of Adelaide South Australia. downloaded from 'http://tams-www.informatik.uni-hamburg.de/vhdl/doc/cookbook/VHDL-Cookbook.pdf' on Dec. 7, 2006.*

\* cited by examiner

Primary Examiner—Meng-Al T. An
Assistant Examiner—Jason Mitchell
(74) Attorney, Agent, or Firm—Gamburd Law Group LLC

(57) ABSTRACT

The present invention provides a system, method and software for programming and configuring an adaptive computing architecture or device. The invention utilizes program constructs which correspond to and map directly to the adaptive hardware having a plurality of reconfigurable nodes coupled through a reconfigurable matrix interconnection network. A first program construct corresponds to a selected node. A second program construct corresponds to an executable task of the selected node and includes one or more firing conditions capable of determining the commencement of the executable task of the selected node. A third program construct corresponds to at least one input port coupling the selected node to the matrix interconnect network for input data to be consumed by the executable task. A fourth program construct corresponds to at least one output port coupling the selected node to the matrix interconnect network for output data to be produced by the executable task.

47 Claims, 22 Drawing Sheets

ADAPTIVE COMPUTING ENGINE (ACE)

| 500 | FIG. 6A | FIG. 6B | FIG. 6C | FIG. 6D |

SYSTEM, METHOD AND SOFTWARE FOR STATIC AND DYNAMIC PROGRAMMING AND CONFIGURATION OF AN ADAPTIVE COMPUTING ARCHITECTURE

CROSS-REFERENCE TO A RELATED APPLICATION

This application is related to a Paul L. Master et al., U.S. patent application Ser. No. 10/384,486, entitled "Adaptive Integrated Circuitry With Heterogeneous And Reconfigurable Matrices Of Diverse And Adaptive Computational Units Having Fixed, Application Specific Computational Elements", filed Mar. 7, 2003, commonly assigned to QuickSilver Technology, Inc., and incorporated by reference herein, with priority claimed for all commonly disclosed subject matter (the "related application"), which is a continuation-in-part of Paul L. Master et al., U.S. patent application Ser. No. 09/1815,122 now U.S. Pat. No. 6,836,839, entitled "Adaptive Integrated Circuitry With Heterogeneous And Reconfigurable Matrices Of Diverse And Adaptive Computational Units Having Fixed, Application Specific Computational Elements", filed Mar. 22, 2001, commonly assigned to QuickSilver Technology, Inc.

FIELD OF THE INVENTION

The present invention relates, in general, to programming of integrated circuits and systems for particular applications, and more particularly, to a system, method and software for static and dynamic programming and configuration of an adaptive computing integrated circuit architecture.

BACKGROUND OF THE INVENTION

The related application discloses a new form or type of integrated circuit, referred to as an adaptive computing engine ("ACE") or adaptive computing machine ("ACM"), which is readily reconfigurable, in real time, and is capable of having corresponding, multiple modes of operation. The ACM is a new and innovative hardware platform suitable for digital signal processing, Telematics, and other applications where small hardware footprint, low power consumption and high performance characteristics are highly desirable.

The ACE architecture for adaptive or reconfigurable computing, includes a plurality of different or heterogeneous computational elements coupled to an interconnection network. The plurality of heterogeneous computational elements include corresponding computational elements having fixed and differing architectures, such as fixed architectures for different functions such as memory, addition, multiplication, complex multiplication, subtraction, configuration, reconfiguration, control, input, output, and field programmability. In response to configuration information, the interconnection network is operative in real time to adapt (configure and reconfigure) the plurality of heterogeneous computational elements for a plurality of different functional modes, including linear algorithmic operations, non-linear algorithmic operations, finite state machine operations, memory operations, and bit-level manipulations.

As a consequence, the interconnection network and other ACE hardware need to be configured and generally also reconfigured, either statically or dynamically, to perform any given application or algorithm.

The ACE architecture also utilizes a data flow model for processing. More particularly, input operand data will be processed to produce output data (without other intervention such as interrupt signals, instruction fetching, etc.), whenever the input data is available and an output port (register or buffer) is available for any resulting output data. Controlling the data flow processing to implement an algorithm, however, presents unusual difficulties, including for controlling data flow in the communication and control algorithms used in a wide variety of applications, such as wideband CDMA ("WCDMA") and cdma2000.

Given this new and unique adaptive computing integrated circuit architecture, a need remains for a method, system and software to program and configure the adaptive computing architecture (or device), either statically or dynamically, to perform one or more applications

SUMMARY OF THE INVENTION

The present invention provides a plurality of program constructs which enable the static or dynamic programming and configuration of an adaptive computing device, such as an ACE (ACM) having a plurality of heterogeneous nodes coupled through a matrix interconnect network.

The various system, method and software embodiments of the invention provide a plurality of program constructs:

a first program construct, such as a "module", having a correspondence to a selected node of the plurality of heterogeneous nodes;

a second program construct, such as a "process", having a correspondence to an executable task of the selected node, and having at least one firing condition capable of determining a commencement of the executable task of the selected node;

a third program construct, such as an "inpipe", having a correspondence to at least one input port coupling the selected node to the matrix interconnect network for input data to be consumed by the executable task;

a fourth program construct, such as an "outpipe", having a correspondence to at least one output port coupling the selected node to the matrix interconnect network for output data to be produced by the executable task;

a fifth program construct, such as a "notify" routine, having a correspondence to a notification of creation of output data, and a sixth program construct, such as a "release" routine, having a correspondence to a notification of consumption of input data, such that the fifth program construct and the sixth program construct provide for synchronization of production of output data with consumption of input data;

a seventh program construct, such as a "ready" routine, having a correspondence to a task manager of the selected node to provide for commencement of the executable task, which also provides initialization of a producer count table of the task manager or a consumer count table of the task manager within the selected node; and an eighth program construct, such as a "link" routine, linking the fourth program construct to the third program construct, the eighth program construct corresponding to a selected configuration of the matrix interconnection network providing a communication path from a selected output port to a selected input port.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings and examples which form a portion of the specification, in which.

DETAILED DESCRIPTION OF THE INVENTION

Figure 1:
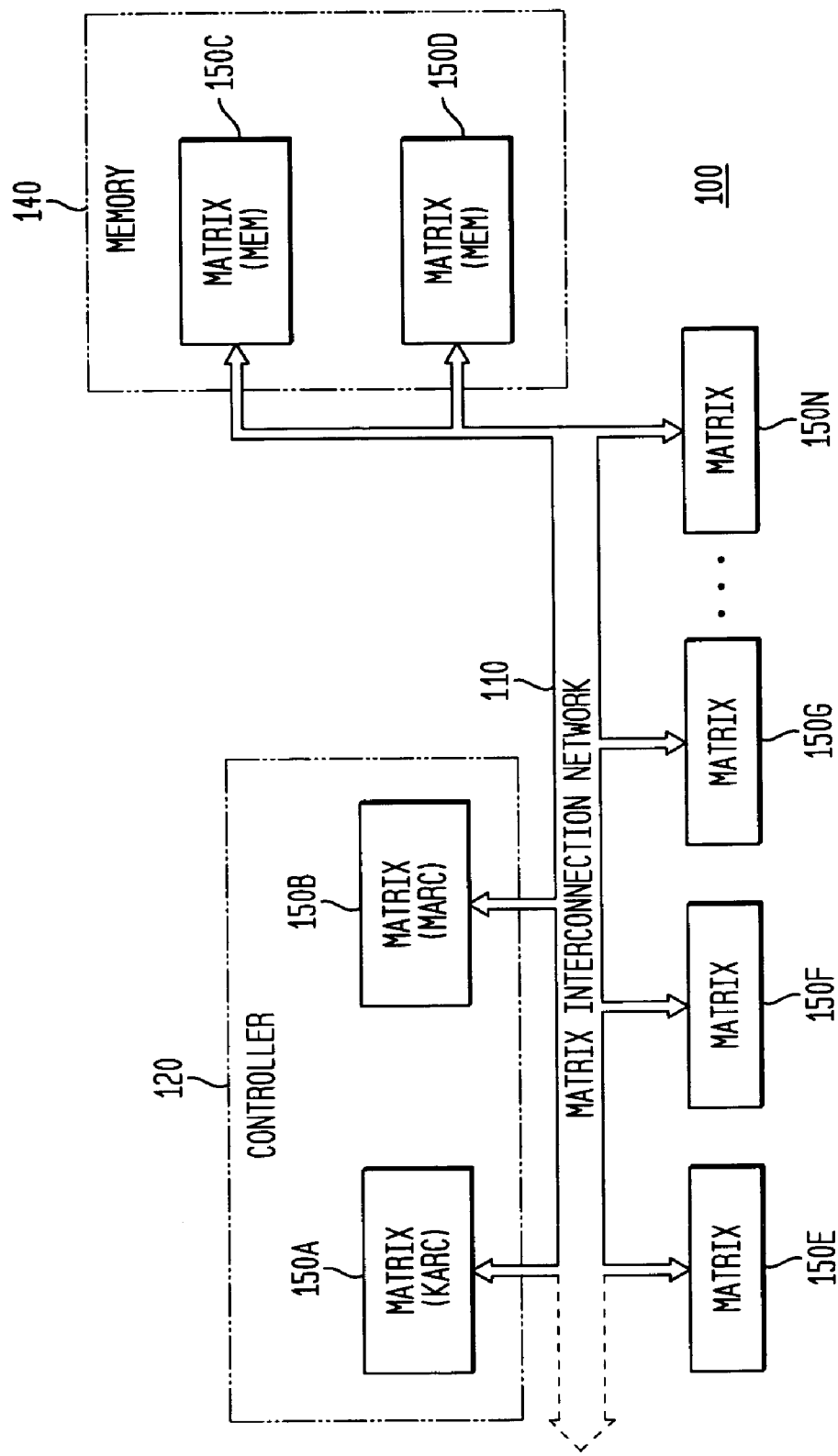
FIG. 1 is a block diagram illustrating an exemplary first apparatus embodiment in accordance with the invention of the related application.

While the present invention is susceptible of embodiment in many different forms, there are shown in the drawings and will be described herein in detail specific examples and embodiments thereof, with the understanding that the present disclosure is to be considered as an exemplification of the principles of the invention and is not intended to limit the invention to the specific examples and embodiments illustrated.

As indicated above, the present invention provides a system, method and software for programming and configuring an adaptive computing device such as an ACE 100. The present invention provides such a programming methodology using a series of unique constructs which are capable of being mapped directly to the hardware features of the ACE 100 and which are also capable of configuring the matrix interconnect network of the ACE 100 for, among other things, the routing of output data and input data. The various program constructs of the present invention have additional features, such as providing synchronization among the various tasks which may be executed within the ACE 100.

In the following discussion, a background of an exemplary adaptive computing architecture is provided with reference to FIGS. 1 through 15. Following this background discussion, the present invention is discussed in detail with reference to Examples 1 through 25.

FIG. 1 is a block diagram illustrating a first apparatus 100 embodiment in accordance with the invention of the related application. The apparatus 100, referred to herein as an adaptive computing engine ("ACE") 100, is preferably embodied as an integrated circuit, or as a portion of an integrated circuit having other, additional components. In the first apparatus embodiment, and as discussed in greater detail below, the ACE 100 includes one or more reconfigurable matrices (or nodes) 150, such as matrices 150A through 150N as illustrated, and a matrix interconnection network 110. Also in the first apparatus embodiment, and as discussed in detail below, one or more of the matrices (nodes) 150, such as matrices 150A and 150B, are configured for functionality as a controller 120, while other matrices, such as matrices 150C and 150D, are configured for functionality as a memory 140. The various matrices 150 and matrix interconnection network 110 may also be implemented together as fractal subunits, which may be scaled from a few nodes to thousands of nodes.

A significant departure from the prior art, the ACE 100 does not utilize traditional (and typically separate) data, direct memory access (DMA), random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, in real time, to provide any given connection between and among the reconfigurable matrices 150, including those matrices 150 configured as the controller 120 and the memory 140, as discussed in greater detail below.

The matrices 150 configured to function as memory 140 may be implemented in any desired or preferred way, utilizing computational elements (discussed below) of fixed memory elements, and may be included within the ACE 100 or incorporated within another IC or portion of an IC. In the first apparatus embodiment, the memory 140 is included within the ACE 100, and preferably is comprised of computational elements which are low power consumption random access memory (RAM), but also may be comprised of computational elements of any other form of memory, such as flash, DRAM, SRAM, SDRAM, FRAM, MRAM, ROM, EPROM or $E^2$PROM. In the first apparatus embodiment, the memory 140 preferably includes DMA engines, not separately illustrated.

The controller 120 is preferably implemented, using matrices 150A and 150B configured as adaptive finite state machines, as a reduced instruction set ("RISC") processor, controller or other device or IC capable of performing the two types of functionality discussed below. (Alternatively, these functions may be implemented utilizing a conventional RISC or other processor.) The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the exemplary form of combined data, configuration and control information referred to herein as a "silverware" module. The kernel controller is also referred to as a "K-node", discussed in greater detail below with reference to FIGS. 10 and 11.

Figure 3:
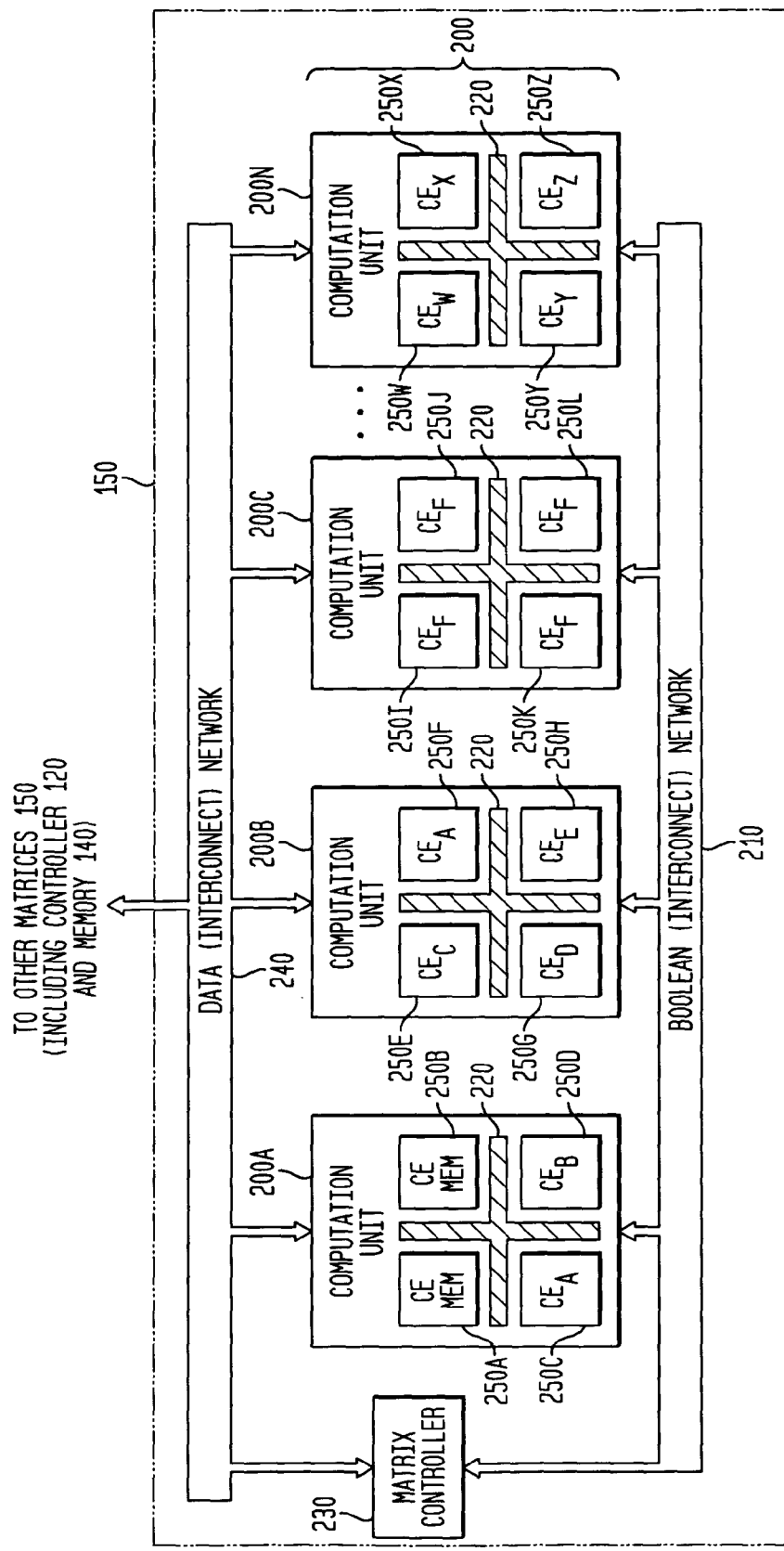
FIG. 3 is a block diagram illustrating a reconfigurable matrix (or node), a plurality of computation units, and a plurality of computational elements.
Figure 4:
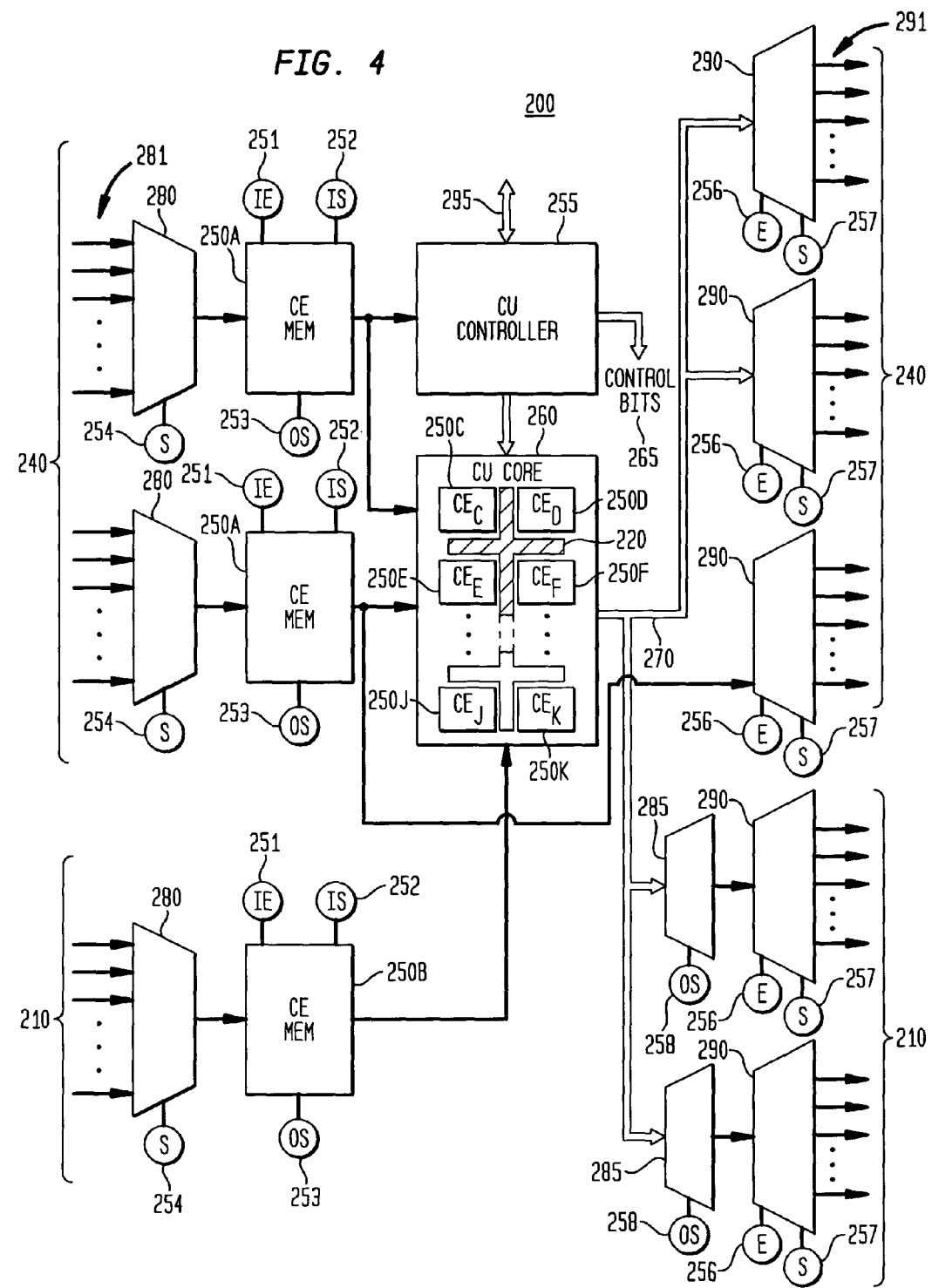
FIG. 4 is a block diagram illustrating, in greater detail, a computational unit of a reconfigurable matrix.

The matrix interconnection network ("MIN") 110 of FIG. 1, and its subset interconnection networks separately illustrated in FIGS. 3 and 4 (Boolean interconnection network 210, data interconnection network 240, and interconnect 220), individually, collectively and generally referred to herein as "interconnect", "interconnection(s)" or "interconnection network(s)", may be implemented generally as known in the art, such as utilizing FPGA interconnection networks or switching fabrics, albeit in a considerably more varied fashion. In the first apparatus embodiment, the various interconnection networks are implemented as described, for example, in U.S. Pat. No. 5,218,240, U.S. Pat. No. 5,336,950, U.S. Pat. No. 5,245,227, and U.S. Pat. No. 5,144,166, and also as discussed below and as illustrated with reference to FIGS. 7, 8 and 9. These various interconnection networks provide selectable (or switchable) connections between and among the controller 120, the memory 140, the various matrices 150, and the computational units 200 and computational elements 250 discussed below, providing the physical basis for the configuration and reconfiguration referred to herein, in response to and under the control of configuration signaling generally referred to herein as "configuration information". In addition, the various interconnection networks (110, 210, 240 and 220) provide selectable or switchable data, input, output, control and configuration paths, between and among the controller 120, the memory 140, the various matrices 150, and the computational units 200 and computational elements 250, in lieu of any form of traditional or separate input/output busses, data busses, DMA, RAM, configuration and instruction busses. In the second apparatus embodiment, the various interconnection networks are implemented as described below with reference to FIGS. 12 and 13, using various combinations of routing elements, such as token rings or arbiters, and multiplexers, at varying levels within the system and apparatus embodiments of the invention of the related application.

It should be pointed out, however, that while any given level of switching or selecting operation of or within the various interconnection networks (110, 210, 240 and 220) may be implemented as known in the art, the combinations of routing elements and multiplexing elements, the use of different routing elements and multiplexing elements at differing levels within the system, and the design and layout of the various interconnection networks (110, 210, 240 and 220), are new and novel, as discussed in greater detail below. For example, varying levels of interconnection are provided to correspond to the varying levels of the matrices 150, the computational units 200, and the computational elements 250, discussed below. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix 150 or computational unit 200, however, the interconnection network (210, 220 and 240) may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable computational (or computation) units (200); the computational units 200, in turn, generally contain a different or varied mix of fixed, application specific computational elements (250), discussed in greater detail below with reference to FIGS. 3 and 4, which may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110, also as discussed in greater detail below.

Several different, insightful and novel concepts are incorporated within the ACE 100 architecture of the invention of the related application, and provide a useful explanatory basis for the real time operation of the ACE 100 and its inherent advantages.

The first novel concepts concern the adaptive and reconfigurable use of application specific, dedicated or fixed hardware units (computational elements 250), and the selection of particular functions for acceleration, to be included within these application specific, dedicated or fixed hardware units (computational elements 250) within the computational units 200 (FIG. 3) of the matrices 150, such as pluralities of multipliers, complex multipliers, and adders, each of which are designed for optimal execution of corresponding multiplication, complex multiplication, and addition functions. Given that the ACE 100 is to be optimized, in the first apparatus embodiment, for low power consumption, the functions for acceleration are selected based upon power consumption. For example, for a given application such as mobile communication, corresponding C (C# or C++) or other code may be analyzed for power consumption. Such empirical analysis may reveal, for example, that a small portion of such code, such as 10%, actually consumes 90% of the operating power when executed. On the basis of such power utilization, this small portion of code is selected for acceleration within certain types of the reconfigurable matrices 150, with the remaining code, for example, adapted to run within matrices 150 configured as controller 120. Additional code may also be selected for acceleration, resulting in an optimization of power consumption by the ACE 100, up to any potential trade-off resulting from design or operational complexity. In addition, as discussed with respect to FIG. 3, other functionality, such as control code, may be accelerated within matrices 150 when configured as finite state machines.

Figure 2:
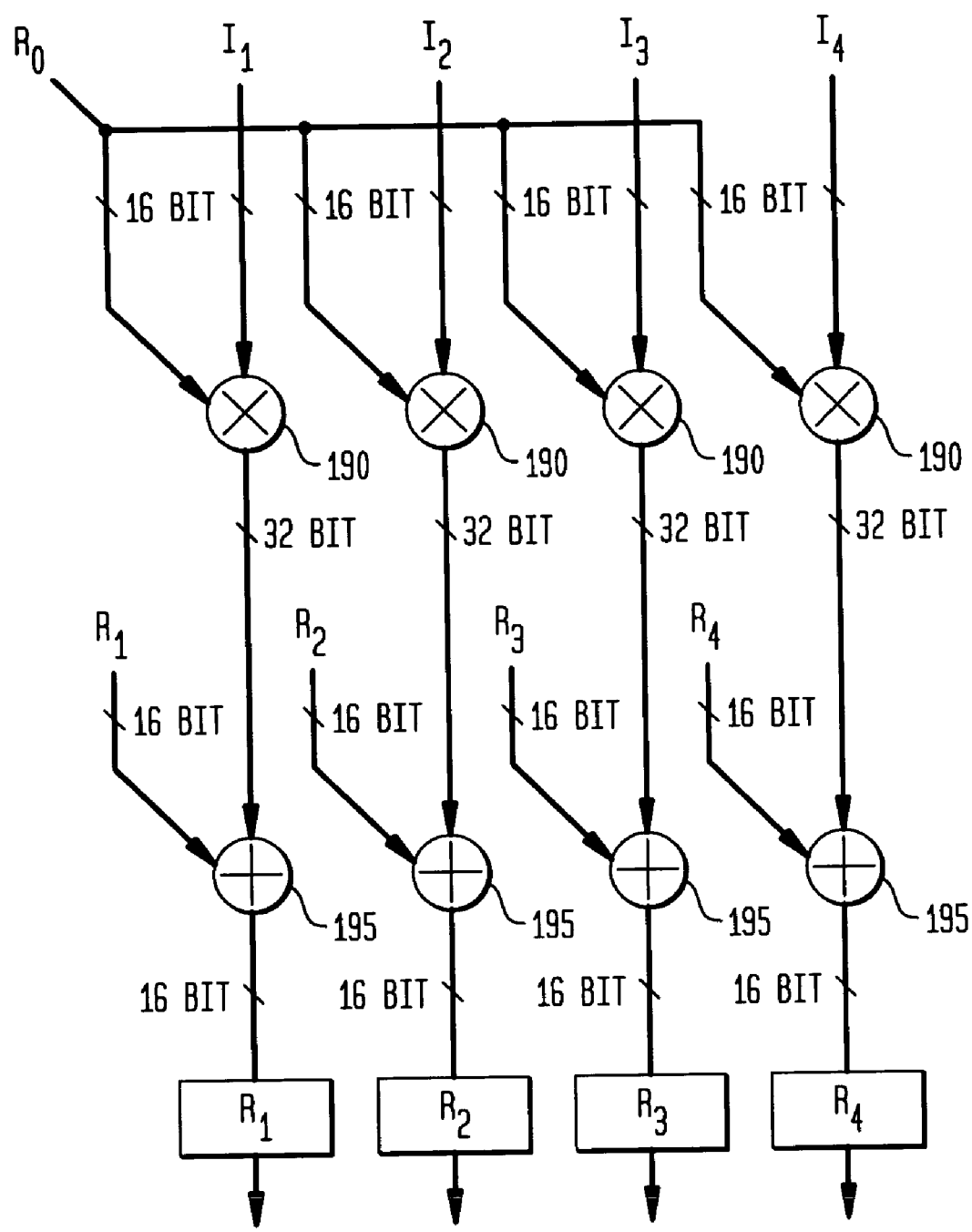
FIG. 2 is a schematic diagram illustrating an exemplary data flow graph.

Next, the ACE 100 utilizes a data flow model for all processes and computations. Algorithms or other functions selected for acceleration may be converted into a form which may be represented as a "data flow graph" ("DFG"). A schematic diagram of an exemplary data flow graph is illustrated in FIG. 2. As illustrated in FIG. 2, an algorithm or function useful for CDMA voice coding (QCELP (Qualcomm code excited linear prediction)) is implemented utilizing four multipliers 190 followed by four adders 195. Through the varying levels of interconnect, the algorithms of this data flow graph are then implemented, at any given time, through the configuration and reconfiguration of fixed computational elements (250), namely, implemented within hardware which has been optimized and configured for efficiency, i.e., a "machine" is configured in real time which is optimized to perform the particular algorithm. Continuing with the exemplary DFG or FIG. 2, four fixed or dedicated multipliers, as computational elements 250, and four fixed or dedicated adders, also as different computational elements 250, are configured in real time through the interconnect to perform the functions or algorithms of the particular DFG. Using this data flow model, data which is produced, such as by the multipliers 190, is immediately consumed, such as by adders 195.

The third and perhaps most significant concept, and a marked departure from the concepts and precepts of the prior art, is the concept of reconfigurable "heterogeneity" utilized to implement the various selected algorithms mentioned above. As indicated above, prior art reconfigurability has relied exclusively on homogeneous FPGAs, in which identical blocks of logic gates are repeated as an array within a rich, programmable interconnect, with the interconnect subsequently configured to provide connections between and among the identical gates to implement a particular function, albeit inefficiently and often with routing and combinatorial problems. In stark contrast, within computation units 200, different computational elements (250) are implemented directly as correspondingly different fixed (or dedicated) application specific hardware, such as dedicated multipliers, complex multipliers, accumulators, arithmetic logic units (ALUs), registers, and adders. Utilizing interconnect (210 and 220), these differing, heterogeneous computational elements (250) may then be adaptively configured, in real time, to perform the selected algorithm, such as the performance of discrete cosine transformations often utilized in mobile communications. For the data flow graph example of FIG. 2, four multipliers and four adders will be configured, i.e., connected in real time, to perform the particular algorithm. As a consequence, different ("heterogeneous") computational elements (250) are configured and reconfigured, at any given time, to optimally perform a given algorithm or other function. In addition, for repetitive functions, a given instantiation or configuration of computational elements may also remain in place over time, i.e., unchanged, throughout the course of such repetitive calculations.

The temporal nature of the ACE 100 architecture should also be noted. At any given instant of time, utilizing different levels of interconnect (110, 210, 240 and 220), a particular configuration may exist within the ACE 100 which has been optimized to perform a given function or implement a particular algorithm. At another instant in time, the configuration may be changed, to interconnect other computational elements (250) or connect the same computational elements 250 differently, for the performance of another function or algorithm. Two important features arise from this temporal reconfigurability. First, as algorithms may change over time to, for example, implement a new technology standard, the ACE 100 may co-evolve and be reconfigured to implement the new algorithm. For a simplified example, a fifth multiplier and a fifth adder may be incorporated into the DFG of FIG. 2 to execute a correspondingly new algorithm, with additional interconnect also potentially utilized to implement any additional bussing functionality. Second, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors.

This temporal reconfigurability of computational elements 250, for the performance of various different algorithms, also illustrates a conceptual distinction utilized herein between adaptation (configuration and reconfiguration), on the one hand, and programming or reprogrammability, on the other hand. Typical programmability utilizes a pre-existing group or set of functions, which may be called in various orders, over time, to implement a particular algorithm. In contrast, configurability and reconfigurability (or adaptation), as used herein, includes the additional capability of adding or creating new functions which were previously unavailable or non-existent.

Next, the present and related inventions also utilize a tight coupling (or interdigitation) of data and configuration (or other control) information, within one, effectively continuous stream of information. This coupling or commingling of data and configuration information, referred to as a "silverware" module, is the subject of a separate, related patent application. For purposes of the present invention, however, it is sufficient to note that this coupling of data and configuration information into one information (or bit) stream helps to enable real time reconfigurability of the ACE 100, without a need for the (often unused) multiple, overlaying networks of hardware interconnections of the prior art. For example, as an analogy, a particular, first configuration of computational elements at a particular, first period of time, as the hardware to execute a corresponding algorithm during or after that first period of time, may be viewed or conceptualized as a hardware analog of "calling" a subroutine in software which may perform the same algorithm. As a consequence, once the configuration of the computational elements 250 has occurred (i.e., is in place), as directed by the configuration information, the data for use in the algorithm is immediately available as part of the silverware module. The same computational elements may then be reconfigured for a second period of time, as directed by second configuration information, for execution of a second, different algorithm, also utilizing immediately available data. The immediacy of the data, for use in the configured computational elements 250, provides a one or two clock cycle hardware analog to the multiple and separate software steps of determining a memory address and fetching stored data from the addressed registers. This has the further result of additional efficiency, as the configured computational elements may execute, in comparatively few clock cycles, an algorithm which may require orders of magnitude more clock cycles for execution if called as a subroutine in a conventional microprocessor or DSP.

This use of silverware modules, as a commingling of data and configuration information, in conjunction with the real time reconfigurability of a plurality of heterogeneous and fixed computational elements 250 to form adaptive, different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities. In addition, these operating modes may change based upon the physical location of the device; for example, when configured as a CDMA mobile telephone for use in the United States, the ACE 100 may be reconfigured as a GSM mobile telephone for use in Europe.

Referring again to FIG. 1, the functions of the controller 120 (preferably matrix (KARC) 150A and matrix (MARC) 150B, configured as finite state machines) may be explained:

(1) with reference to a silverware module, namely, the tight coupling of data and configuration information within a single stream of information; (2) with reference to multiple potential modes of operation; (3) with reference to the reconfigurable matrices 150; and (4) with reference to the reconfigurable computation units 200 and the computational elements 150 illustrated in FIG. 3. As indicated above, through a silverware module, the ACE 100 may be configured or reconfigured to perform a new or additional function, such as an upgrade to a new technology standard or the addition of an entirely new function, such as the addition of a music function to a mobile communication device. Such a silverware module may be stored in the matrices 150 of memory 140, or may be input from an external (wired or wireless) source through, for example, matrix interconnection network 110. In the first apparatus embodiment, one of the plurality of matrices 150 is configured to decrypt such a module and verify its validity, for security purposes. Next, prior to any configuration or reconfiguration of existing ACE 100 resources, the controller 120, through the matrix (KARC) 150A, checks and verifies that the configuration or reconfiguration may occur without adversely affecting any pre-existing functionality, such as whether the addition of music functionality would adversely affect pre-existing mobile communications functionality. In the first apparatus embodiment, the system requirements for such configuration or reconfiguration are included within the silverware module, for use by the matrix (KARC) 150A in performing this evaluative function. If the configuration or reconfiguration may occur without such adverse affects, the silverware module is allowed to load into the matrices 150 of memory 140, with the matrix (KARC) 150A setting up the DMA engines within the matrices 150C and 150D of the memory 140 (or other stand-alone DMA engines of a conventional memory). If the configuration or reconfiguration would or may have such adverse affects, the matrix (KARC) 150A does not allow the new module to be incorporated within the ACE 100. Additional functions of the kernel controller, as a K-node, are discussed in greater detail below.

Continuing to refer to FIG. 1, the matrix (MARC) 150B manages the scheduling of matrix 150 resources and the timing of any corresponding data, to synchronize any configuration or reconfiguration of the various computational elements 250 and computation units 200 with any corresponding input data and output data. In the first apparatus embodiment, timing information is also included within a silverware module, to allow the matrix (MARC) 150B through the various interconnection networks to direct a reconfiguration of the various matrices 150 in time, and preferably just in time, for the reconfiguration to occur before corresponding data has appeared at any inputs of the various reconfigured computation units 200. In addition, the matrix (MARC) 150B may also perform any residual processing which has not been accelerated within any of the various matrices 150. As a consequence, the matrix (MARC) 150B may be viewed as a control unit which "calls" the configurations and reconfigurations of the matrices 150, computation units 200 and computational elements 250, in real time, in synchronization with any corresponding data to be utilized by these various reconfigurable hardware units, and which performs any residual or other control processing. Other matrices 150 may also include this control functionality, with any given matrix 150 capable of calling and controlling a configuration and reconfiguration of other matrices 150. This matrix control functionality may also be combined with kernel control, such as in the K-node, discussed below.

FIG. 3 is a block diagram illustrating, in greater detail, a reconfigurable matrix (or node) 150 with a plurality of computation units 200 (illustrated as computation units 200A through 200N), and a plurality of computational elements 250 (illustrated as computational elements 250A through 250Z), and provides additional illustration of the exemplary types of computational elements 250 and a useful summary. As illustrated in FIG. 3, any matrix 150 generally includes a matrix controller 230, a plurality of computation (or computational) units 200, and as logical or conceptual subsets or portions of the matrix interconnect network 110, a data interconnect network 240 and a Boolean interconnect network 210. The matrix controller 230 may also be implemented as a hardware task manager, discussed below with reference to FIG. 10. As mentioned above, in the first apparatus embodiment, at increasing "depths" within the ACE 100 architecture, the interconnect networks become increasingly rich, for greater levels of adaptability and reconfiguration. The Boolean interconnect network 210, also as mentioned above, provides the reconfiguration and data interconnection capability between and among the various computation units 200, and is preferably small (i.e., only a few bits wide), while the data interconnect network 240 provides the reconfiguration and data interconnection capability for data input and output between and among the various computation units 200, and is preferably comparatively large (i.e., many bits wide). It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality. It should also be noted that other, exemplary forms of interconnect are discussed in greater detail below with reference to FIGS. 11–13.

Continuing to refer to FIG. 3, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, such as the quadruple multiplications and additions of the DFG of FIG. 2, utilizing the interconnect 220, the Boolean network 210, and the matrix interconnection network 110. For example, using the multiplexing or routing capabilities discussed below, the inputs/outputs of a computational element 250 may be coupled to outputs/inputs of a first set of (other) computational elements 250, for performance of a first function or algorithm, and subsequently adapted or reconfigured, such that these inputs/outputs are coupled to outputs/inputs of a second set of (other) computational elements 250, for performance of a second function or algorithm.

In the first apparatus embodiment, the various computational elements 250 are designed and grouped together, into the various adaptive and reconfigurable computation units 200 (as illustrated, for example, in FIGS. 5A through 9). In addition to computational elements 250 which are designed to execute a particular algorithm or function, such as multiplication or addition, other types of computational elements 250 are also utilized in the first apparatus embodiment. As illustrated in FIG. 3, computational elements 250A and 250B implement memory, to provide local memory elements for any given calculation or processing function (compared to the more "remote" memory 140). In addition, computational elements 250I, 250J, 250K and 250L are configured to implement finite state machines (using, for example, the computational elements illustrated in FIGS. 7, 8 and 9), to provide local processing capability (compared to the more "remote" matrix (MARC) 150B), especially suitable for complicated control processing, and which may be utilized within the hardware task manager, discussed below.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, and so on (as illustrated below, for example, with reference to FIGS. 5A through 5E and FIG. 6). A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 3 and as illustrated in greater detail below with respect to FIGS. 7 through 9), particularly useful for complicated control sequences, dynamic scheduling, and input/output management, while a fourth type may implement memory and memory management, such as computation unit 200A as illustrated in FIG. 3. Lastly, a fifth type of computation unit 200 may be included to perform bit-level manipulation, such as for encryption, decryption, channel coding, Viterbi decoding, and packet and protocol processing (such as Internet Protocol processing).

In the first apparatus embodiment, in addition to control from other matrices or nodes 150, a matrix controller 230 may also be included within any given matrix 150, also to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

As indicated above, the plurality of heterogeneous computational elements 250 may be configured and reconfigured, through the levels of the interconnect network (110, 210, 220, 240), for performance of a plurality of functional or operational modes, such as linear operations, non-linear operations, finite state machine operations, memory and memory management, and bit-level manipulation. This configuration and reconfiguration of the plurality of heterogeneous computational elements 250 through the levels of the interconnect network (110, 210, 220, 240), however, may be conceptualized on another, higher or more abstract level, namely, configuration and reconfiguration for the performance of a plurality of algorithmic elements.

At this more abstract level of the algorithmic element, the performance of any one of the algorithmic elements may be considered to require a simultaneous performance of a plurality of the lower-level functions or operations, such as move, input, output, add, subtract, multiply, complex multiply, divide, shift, multiply and accumulate, and so on, using a configuration (and reconfiguration) of computational elements having a plurality of fixed architectures such as memory, addition, multiplication, complex multiplication, subtraction, synchronization, queuing, over sampling, under sampling, adaptation, configuration, reconfiguration, control, input, output, and field programmability.

When such a plurality of fixed architectures are configured and reconfigured for performance of an entire algorithmic element, this performance may occur using comparatively few clock cycles, compared to the orders of magnitude more clock cycles typically required. The algorithmic elements may be selected from a plurality of algorithmic elements comprising, for example: a radix-2 Fast Fourier Transformation (FFT), a radix-4 Fast Fourier Transformation (FFT1), a radix-2 inverse Fast Fourier Transformation (IFFT), a radix-4 IFFT, a one-dimensional Discrete Cosine Transformation (DCT), a multi-dimensional Discrete Cosine Transformation (DCT), finite impulse response (FIR) filtering, convolutional encoding, scrambling, puncturing, interleaving, modulation mapping, Golay correlation, OVSF code generation, Haddamard Transformation, Turbo Decoding, bit correlation, Griffiths LMS algorithm, variable length encoding, uplink scrambling code generation, downlink scrambling code generation, downlink despreading, uplink spreading, uplink concatenation, Viterbi encoding, Viterbi decoding, cyclic redundancy coding (CRC), complex multiplication, data compression, motion compensation, channel searching, channel acquisition, and multipath correlation. Numerous other algorithmic element examples are discussed in greater detail below with reference to FIG. 10.

In another embodiment of the ACE 100, one or more of the matrices (or nodes) 150 may be designed to be application specific, having a fixed architecture with a corresponding fixed function (or predetermined application), rather than being comprised of a plurality of heterogeneous computational elements which may be configured and reconfigured for performance of a plurality of operations, functions, or algorithmic elements. For example, an analog-to-digital (A/D) or digital-to-analog (D/A) converter may be implemented without adaptive capability. As discussed in greater detail below, common node (matrix) functions also may be implemented without adaptive capability, such as the node wrapper functions discussed below. Under various circumstances, however, the fixed function node may be capable of parameter adjustment for performance of the predetermined application. For example, the parameter adjustment may comprise changing one or more of the following parameters: a number of filter coefficients, a number of parallel input bits, a number of parallel output bits, a number of selected points for Fast Fourier Transformation, a number of bits of precision, a code rate, a number of bits of interpolation of a trigonometric function, and real or complex number valuation. This fixed function node (or matrix) 150, which may be parametizable, will typically be utilized in circumstances where an algorithmic element is used on a virtually continuous basis, such as in certain types of communications or computing applications.

For example, the fixed function node 150 may be a microprocessor (such as a RISC processor), a digital signal processor (DSP), a co-processor, a parallel processor, a controller, a microcontroller, a finite state machine, and so on (with the term "processor" utilized herein to individually or collectively refer, generally and inclusively, to any of the types of processors mentioned above and their equivalents), and may or may not have an embedded operating system. Such a controller or processor fixed function node 150 may be utilized for the various KARC 150A or MARC 150B applications mentioned above, such as providing configuration information to the interconnection network, directing and scheduling the configuration of the plurality of heterogeneous computational elements 250 of the other nodes 150 for performance of the various functional modes or algorithmic elements, or timing and scheduling the configuration and reconfiguration of the plurality of heterogeneous computational elements with corresponding data. In other applications, also for example, the fixed function node may be a cascaded integrated comb (CIC) filter or a parameterized, cascaded integrated comb (CIC) filter; a finite impulse response (FIR) filter or a finite impulse response (FIR) filter parameterized for variable filter length; or an A/D or D/A converter.

FIG. 4 is a block diagram illustrating, in greater detail, an exemplary or representative computation unit 200 of a reconfigurable matrix 150. As illustrated in FIG. 4, a computation unit 200 typically includes a plurality of diverse, heterogeneous and fixed computational elements 250, such as a plurality of memory computational elements 250A and 250B, and forming a computational unit ("CU") core 260, a plurality of algorithmic or finite state machine computational elements 250C through 250K. As discussed above, each computational element 250, of the plurality of diverse computational elements 250, is a fixed or dedicated, application specific circuit, designed and having a corresponding logic gate layout to perform a specific function or algorithm, such as addition or multiplication. In addition, the various memory computational elements 250A and 250B may be implemented with various bit depths, such as RAM (having significant depth), or as a register, having a depth of 1 or 2 bits.

Forming the conceptual data and Boolean interconnect networks 240 and 210, respectively, the exemplary computation unit 200 also includes a plurality of input multiplexers 280, a plurality of input lines (or wires) 281, and for the output of the CU core 260 (illustrated as line or wire 270), a plurality of output demultiplexers 285 and 290, and a plurality of output lines (or wires) 291. Through the input multiplexers 280, an appropriate input line 281 may be selected for input use in data transformation and in the configuration and interconnection processes, and through the output demultiplexers 285 and 290, an output or multiple outputs may be placed on a selected output line 291, also for use in additional data transformation and in the configuration and interconnection processes.

In the first apparatus embodiment, the selection of various input and output lines 281 and 291, and the creation of various connections through the interconnect (210, 220 and 240), is under control of control bits 265 from a computational unit controller 255, as discussed below. Based upon these control bits 265, any of the various input enables 251, input selects 252, output selects 253, MUX selects 254, DEMUX enables 256, DEMUX selects 257, and DEMUX output selects 258, may be activated or deactivated.

The exemplary computation unit 200 includes the computation unit controller 255 which provides control, through control bits 265, over what each computational element 250, interconnect (210, 220 and 240), and other elements (above) does with every clock cycle. Not separately illustrated, through the interconnect (210, 220 and 240), the various control bits 265 are distributed, as may be needed, to the various portions of the computation unit 200, such as the various input enables 251, input selects 252, output selects 253, MUX selects 254, DEMUX enables 256, DEMUX selects 257, and DEMUX output selects 258. The CU controller 255 also includes one or more lines 295 for reception of control (or configuration) information and transmission of status information.

As mentioned above, the interconnect may include a conceptual division into a data interconnect network 240 and a Boolean interconnect network 210, of varying bit widths, as mentioned above. In general, the (wider) data interconnection network 240 is utilized for creating configurable and reconfigurable connections, for corresponding routing of data and configuration information. The (narrower) Boolean interconnect network 210, while also utilized for creating configurable and reconfigurable connections, is utilized for control of logic (or Boolean) decisions of the various data flow graphs, generating decision nodes in such DFGs, and may also be used for data routing within such DFGs.

FIGS. 5A through 5E are block diagrams illustrating, in detail, exemplary fixed and specific computational elements, forming computational units. As will be apparent from review of these Figures, many of the same fixed computational elements are utilized, with varying configurations, for the performance of different algorithms.

Figure 5A:
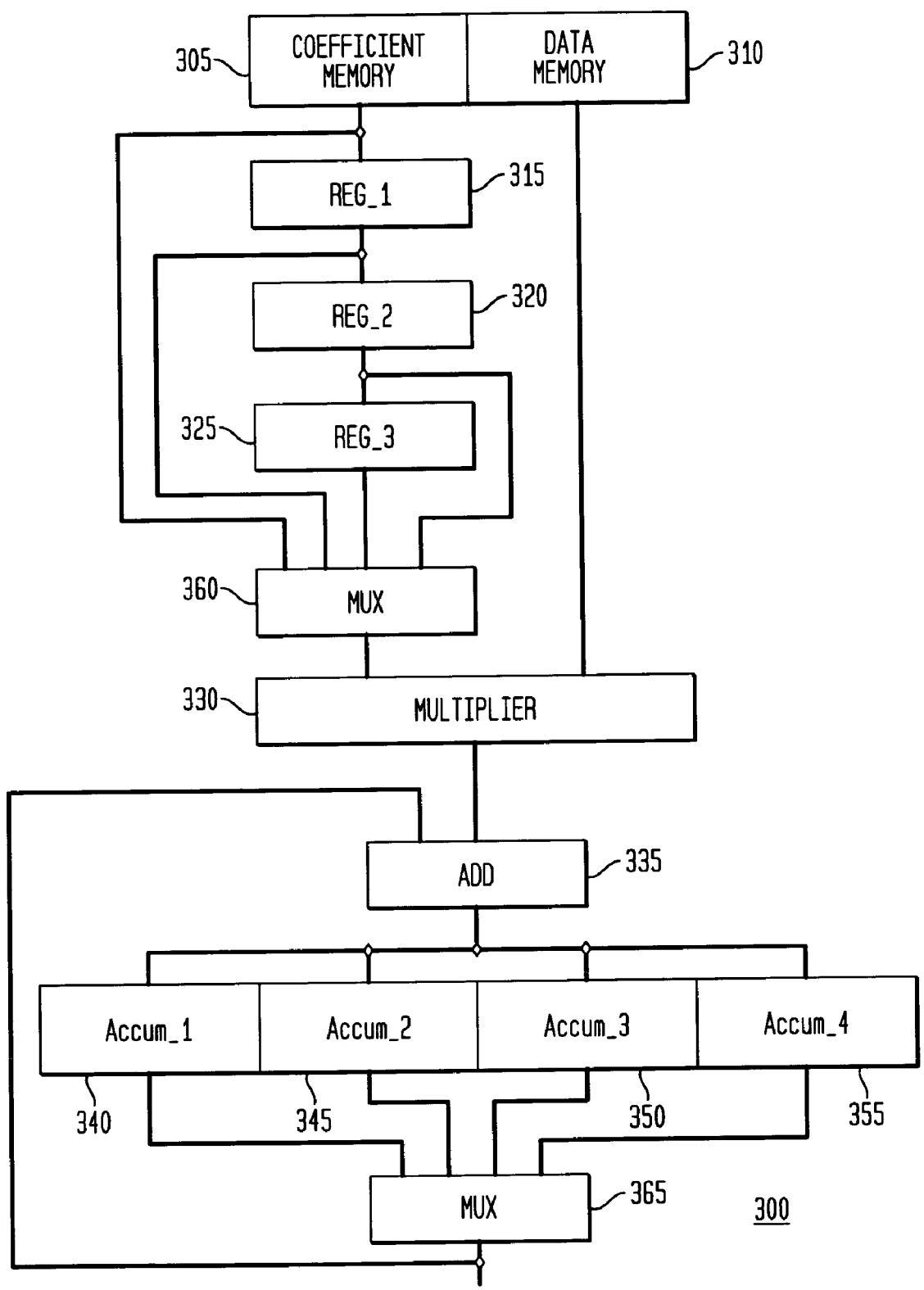
FIGS. 5A through 5E are block diagrams illustrating, in detail, exemplary fixed and specific computational elements, forming computational units.

FIG. 5A is a block diagram illustrating a four-point asymmetric finite impulse response (FIR) filter computational unit 300. As illustrated, this exemplary computational unit 300 includes a particular, first configuration of a plurality of fixed computational elements, including coefficient memory 305, data memory 310, registers 315, 320 and 325, multiplier 330, adder 335, and accumulator registers 340, 345, 350 and 355, with multiplexers (MUXes) 360 and 365 forming a portion of the interconnection network (210, 220 and 240).

Figure 5B:
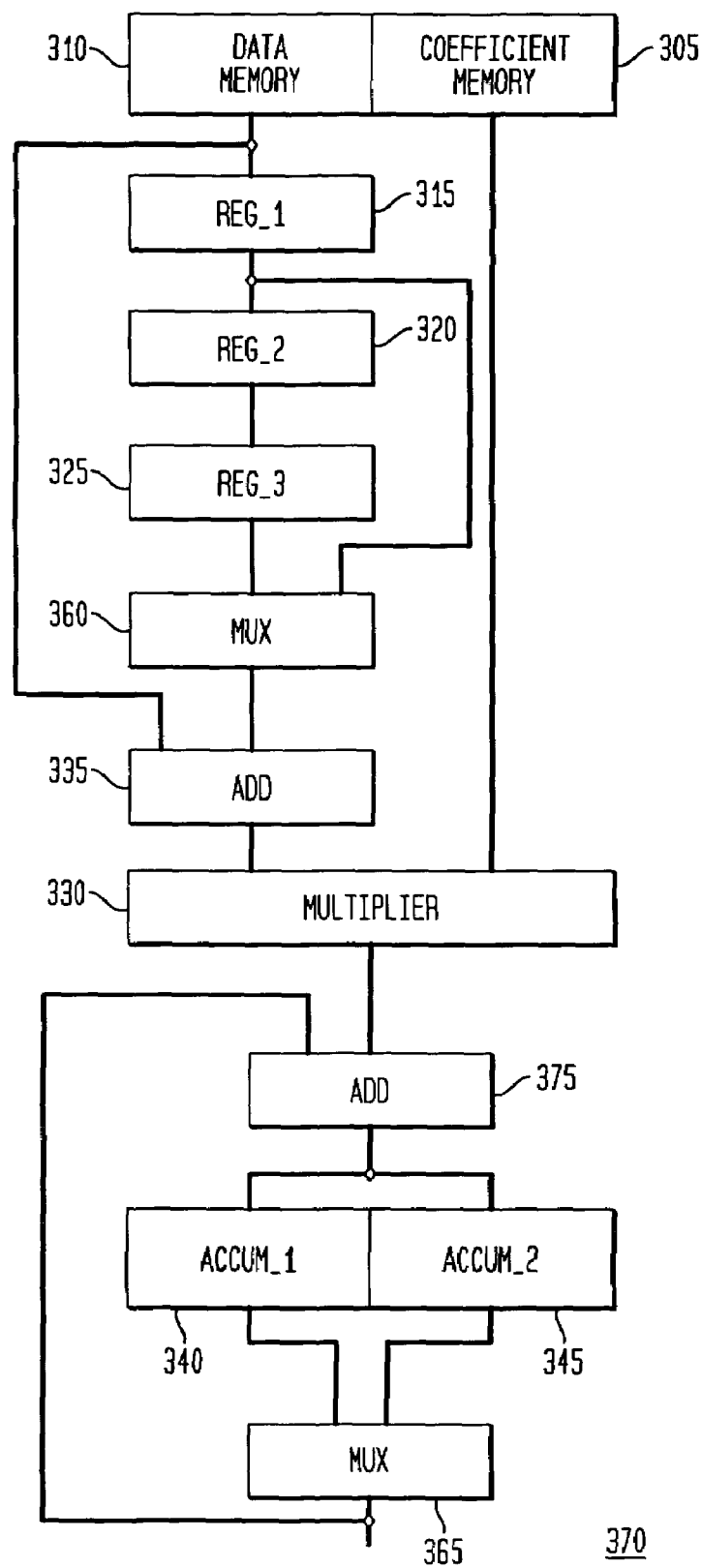

FIG. 5B is a block diagram illustrating a two-point symmetric finite impulse response (FIR) filter computational unit 370. As illustrated, this exemplary computational unit 370 includes a second configuration of a plurality of fixed computational elements, including coefficient memory 305, data memory 310, registers 315, 320 and 325, multiplier 330, adder 335, second adder 375, and accumulator registers 340 and 345, also with multiplexers (MUXes) 360 and 365 forming a portion of the interconnection network (210, 220 and 240).

Figure 5C:
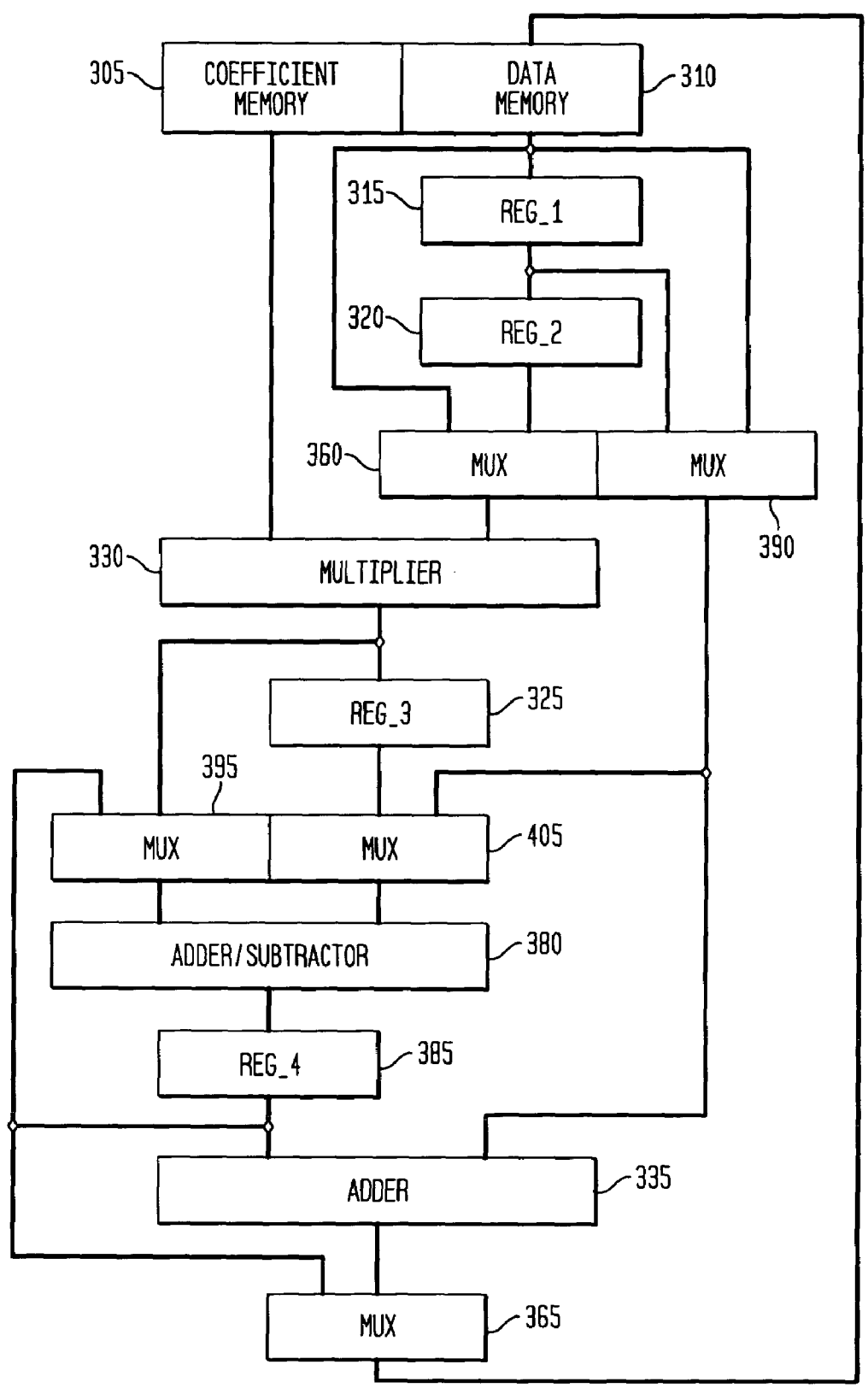

FIG. 5C is a block diagram illustrating a subunit for a fast Fourier transform (FFT) computational unit 400. As illustrated, this exemplary computational unit 400 includes a third configuration of a plurality of fixed computational elements, including coefficient memory 305, data memory 310, registers 315, 320, 325 and 385, multiplier 330, adder 335, and adder/subtracter 380, with multiplexers (MUXes) 360, 365, 390, 395 and 405 forming a portion of the interconnection network (210, 220 and 240).

Figure 5D:
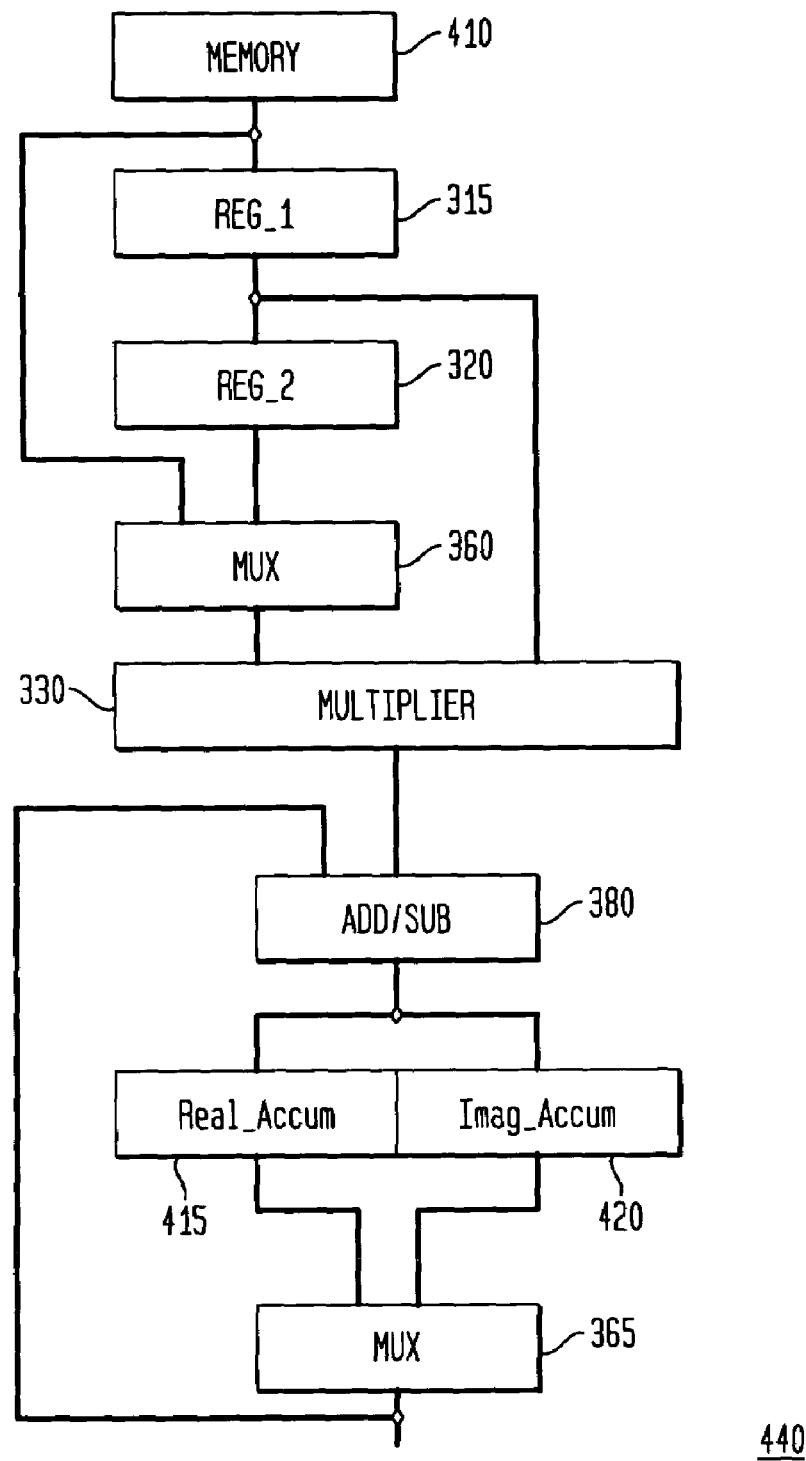

FIG. 5D is a block diagram illustrating a complex finite impulse response (FIR) filter computational unit 440. As illustrated, this exemplary computational unit 440 includes a fourth configuration of a plurality of fixed computational elements, including memory 410, registers 315 and 320, multiplier 330, adder/subtracter 380, and real and imaginary accumulator registers 415 and 420, also with multiplexers (MUXes) 360 and 365 forming a portion of the interconnection network (210, 220 and 240).

Figure 5E:
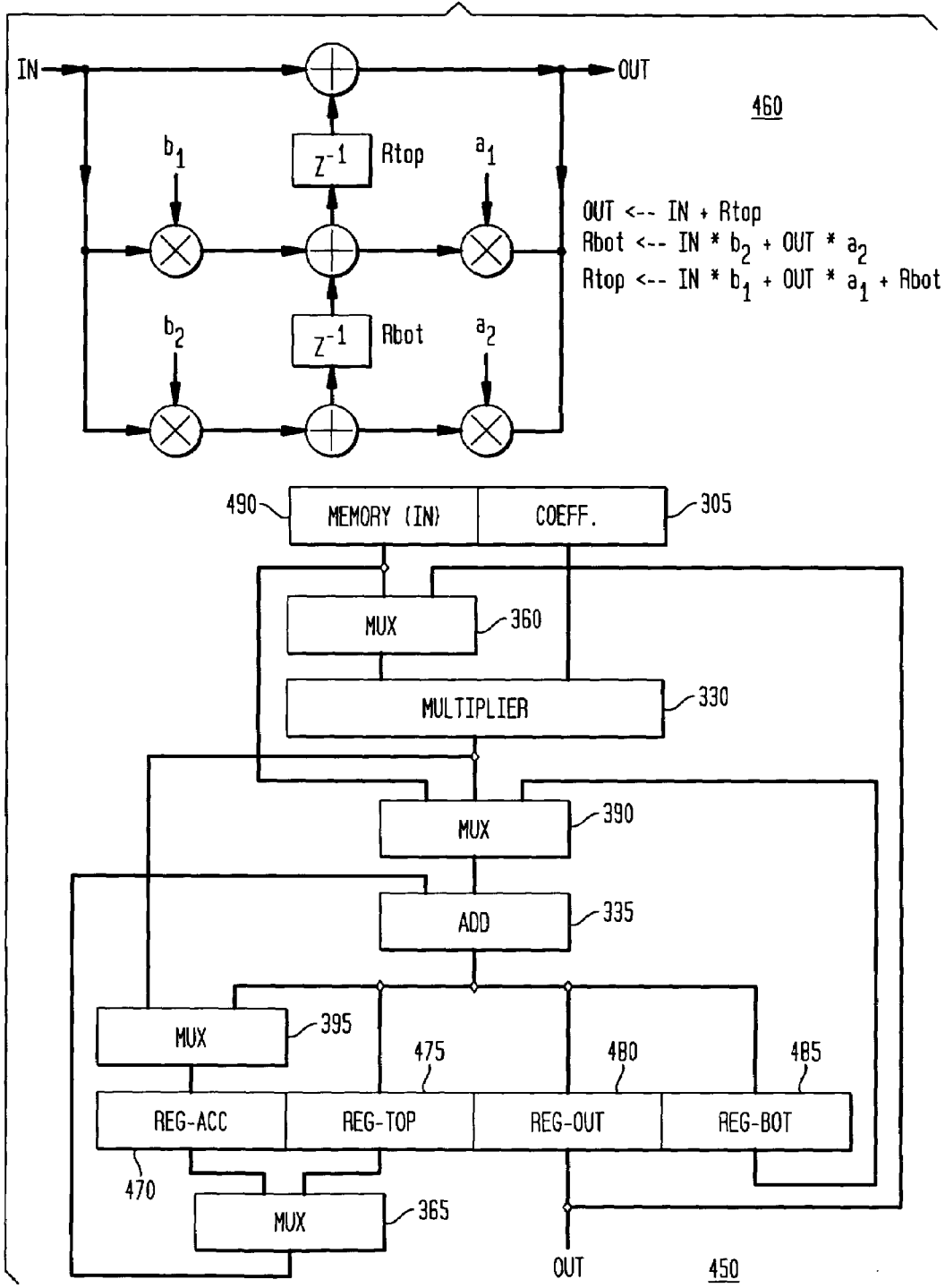

FIG. 5E is a block diagram illustrating a biquad infinite impulse response (IIR) filter computational unit 450, with a corresponding data flow graph 460. As illustrated, this exemplary computational unit 450 includes a fifth configuration of a plurality of fixed computational elements, including coefficient memory 305, input memory 490, registers 470, 475, 480 and 485, multiplier 330, and adder 335, with multiplexers (MUXes) 360, 365, 390 and 395 forming a portion of the interconnection network (210, 220 and 240).

Figures 6, 6A:
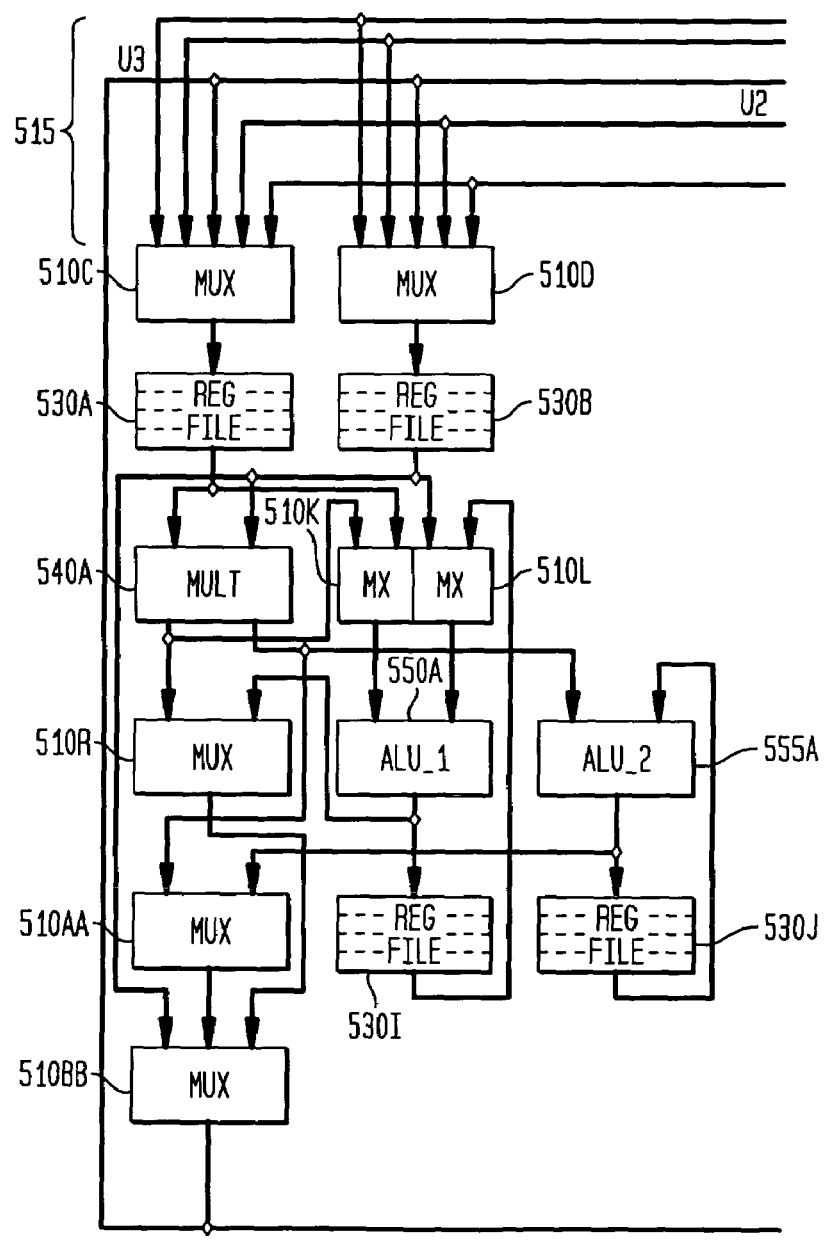
FIG. 6 is a block diagram illustrating, in detail, an exemplary multi-function adaptive computational unit having a plurality of different, fixed computational elements.
Figure 6B:
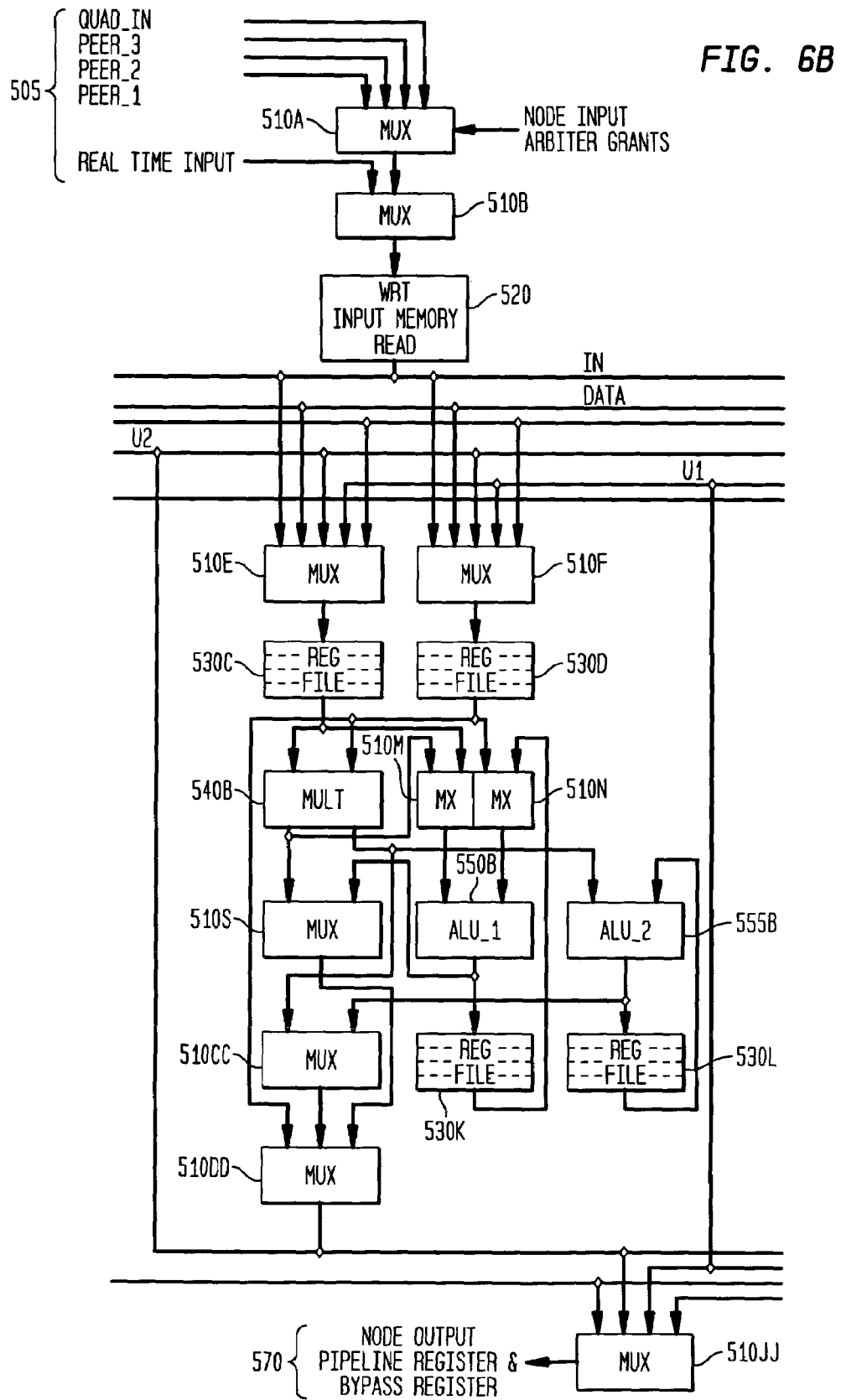
Figure 6C:
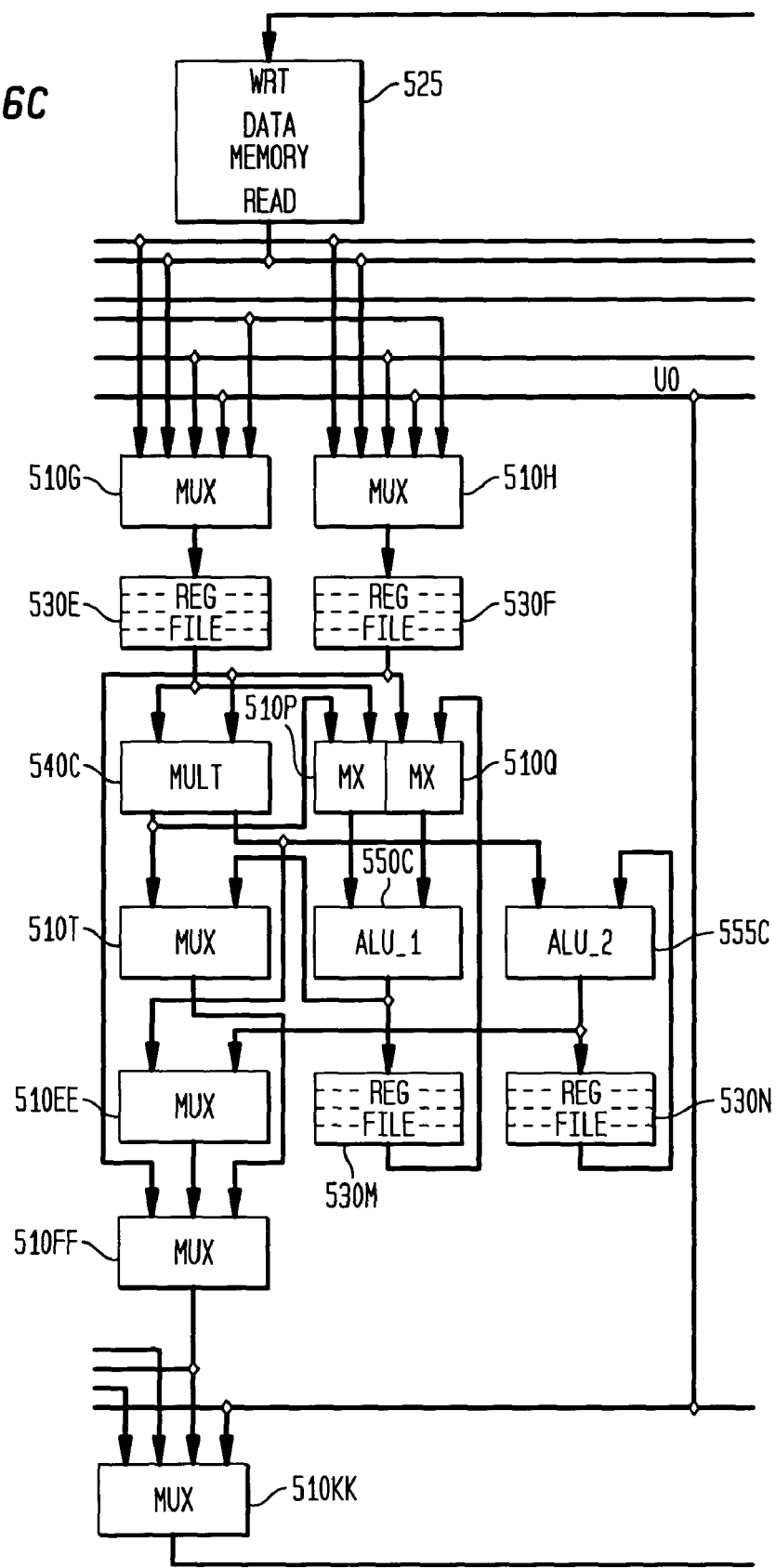
Figure 6D:
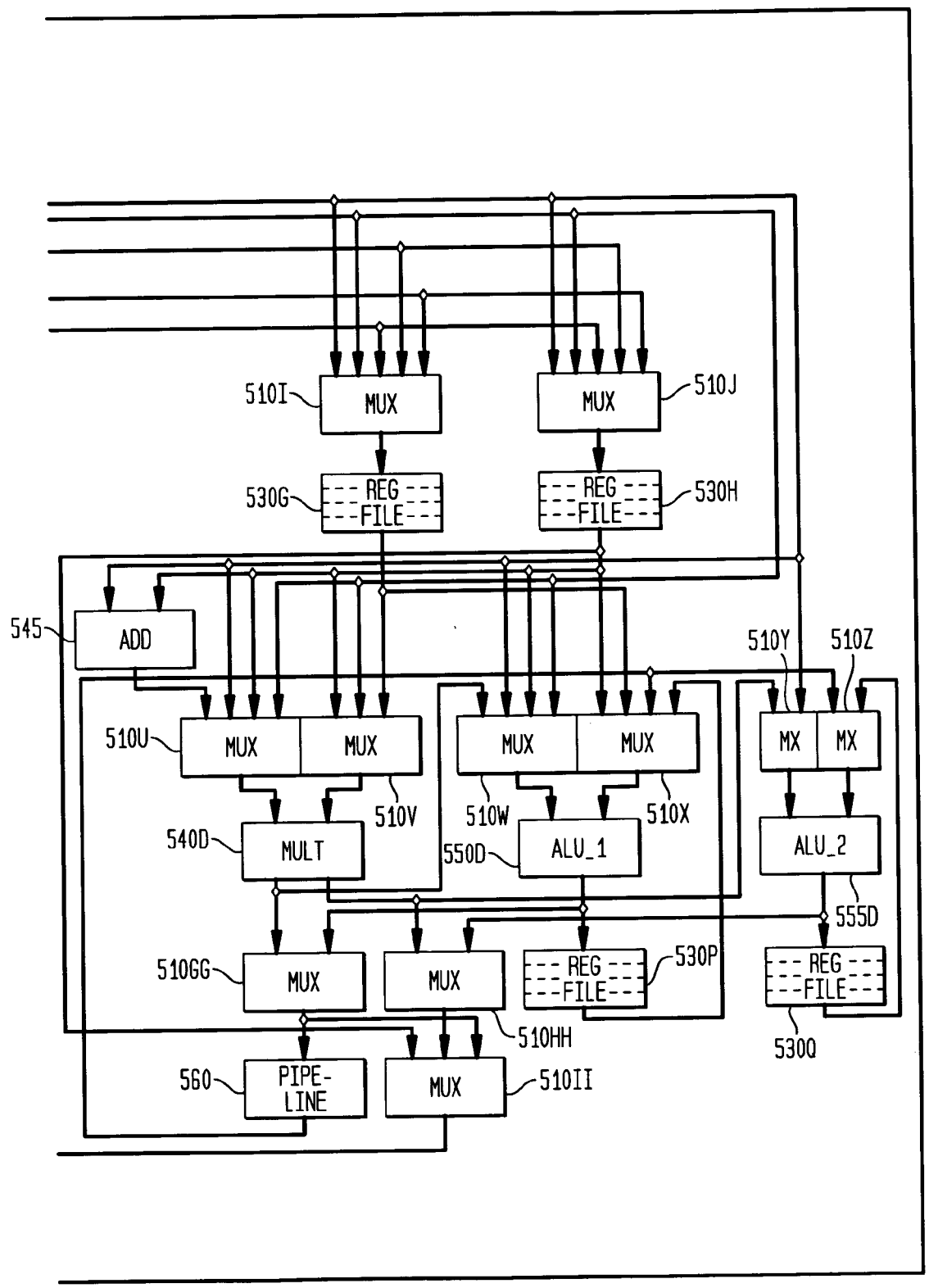

FIG. 6 is a block diagram illustrating, in detail, an exemplary multi-function adaptive computational unit 500 having a plurality of different, fixed computational elements. When configured accordingly, the adaptive computation unit 500 performs each of the various functions previously illustrated with reference to FIGS. 5A though 5E, plus other functions such as discrete cosine transformation. As illustrated, this multi-function adaptive computational unit 500 includes capability for a plurality of configurations of a plurality of fixed computational elements, including input memory 520, data memory 525, registers 530 (illustrated as registers 530A through 530Q), multipliers 540 (illustrated as multipliers 540A through 540D), adder 545, first arithmetic logic unit (ALU) 550 (illustrated as ALU_1s 550A through 550D), second arithmetic logic unit (ALU) 555 (illustrated as ALU_2s 555A through 555D), and pipeline (length 1) register 560, with inputs 505, lines 515, outputs 570, and multiplexers (MUXes or MXes) 510 (illustrates as MUXes and MXes 510A through 510KK) forming an interconnection network (210, 220 and 240). The two different ALUs 550 and 555 are preferably utilized, for example, for parallel addition and subtraction operations, particularly useful for radix 2 operations in discrete cosine transformation.

Figure 7:
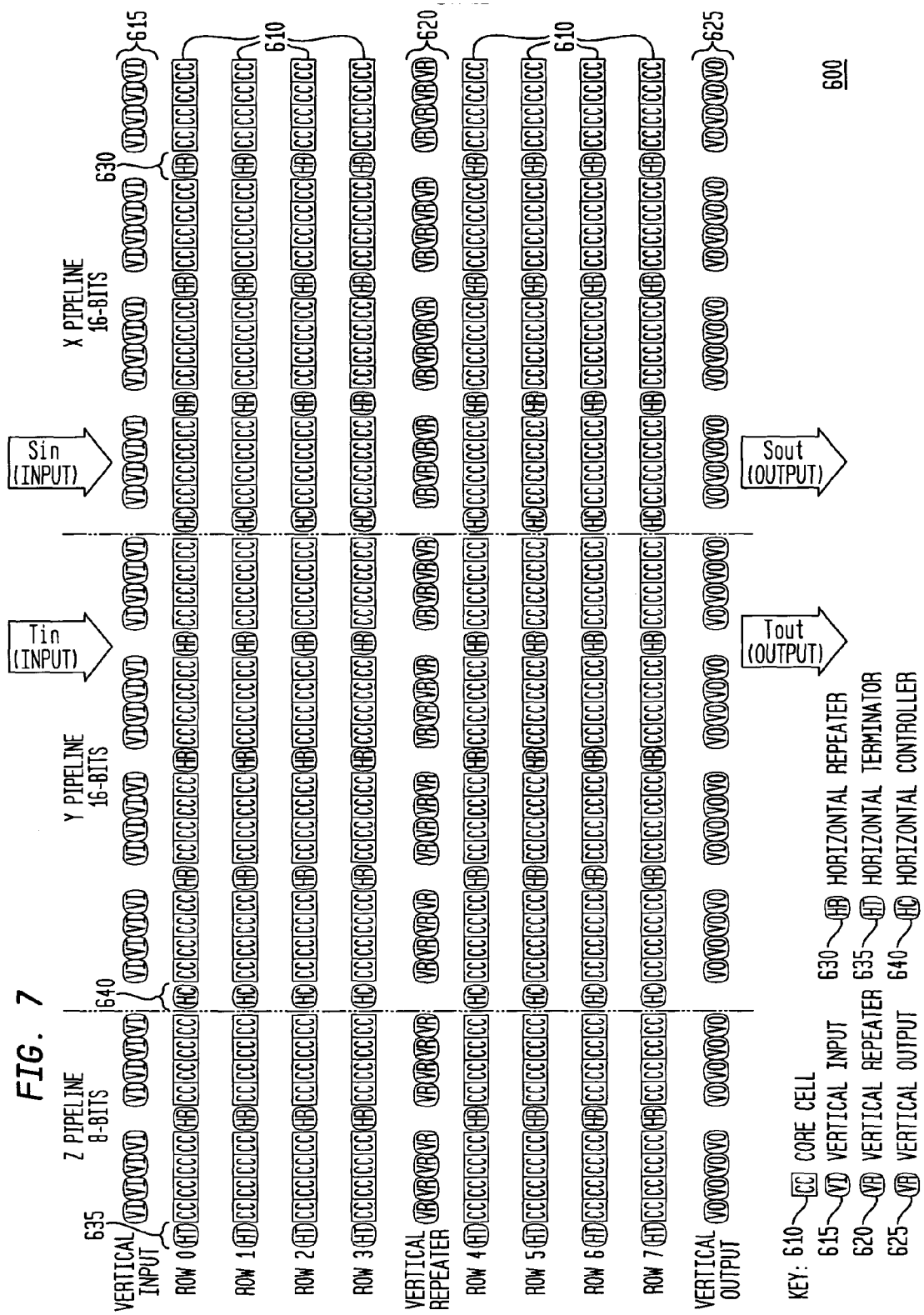
FIG. 7 is a block diagram illustrating, in detail, an adaptive logic processor computational unit having a plurality of fixed computational elements.

FIG. 7 is a block diagram illustrating, in detail, an exemplary adaptive logic processor (ALP) computational unit 600 having a plurality of fixed computational elements. The ALP 600 is highly adaptable, and is preferably utilized for input/output configuration, finite state machine implementation, general field programmability, and bit manipulation. The fixed computational element of ALP 600 is a portion (650) of each of the plurality of adaptive core cells (CCs) 610 (FIG. 8), as separately illustrated in FIG. 9. An interconnection network (210, 220 and 240) is formed from various combinations and permutations of the pluralities of vertical inputs (VIs) 615, vertical repeaters (VRs) 620, vertical outputs (VOs) 625, horizontal repeaters (HRs) 630, horizontal terminators (HTs) 635, and horizontal controllers (HCs) 640.

Figure 8:
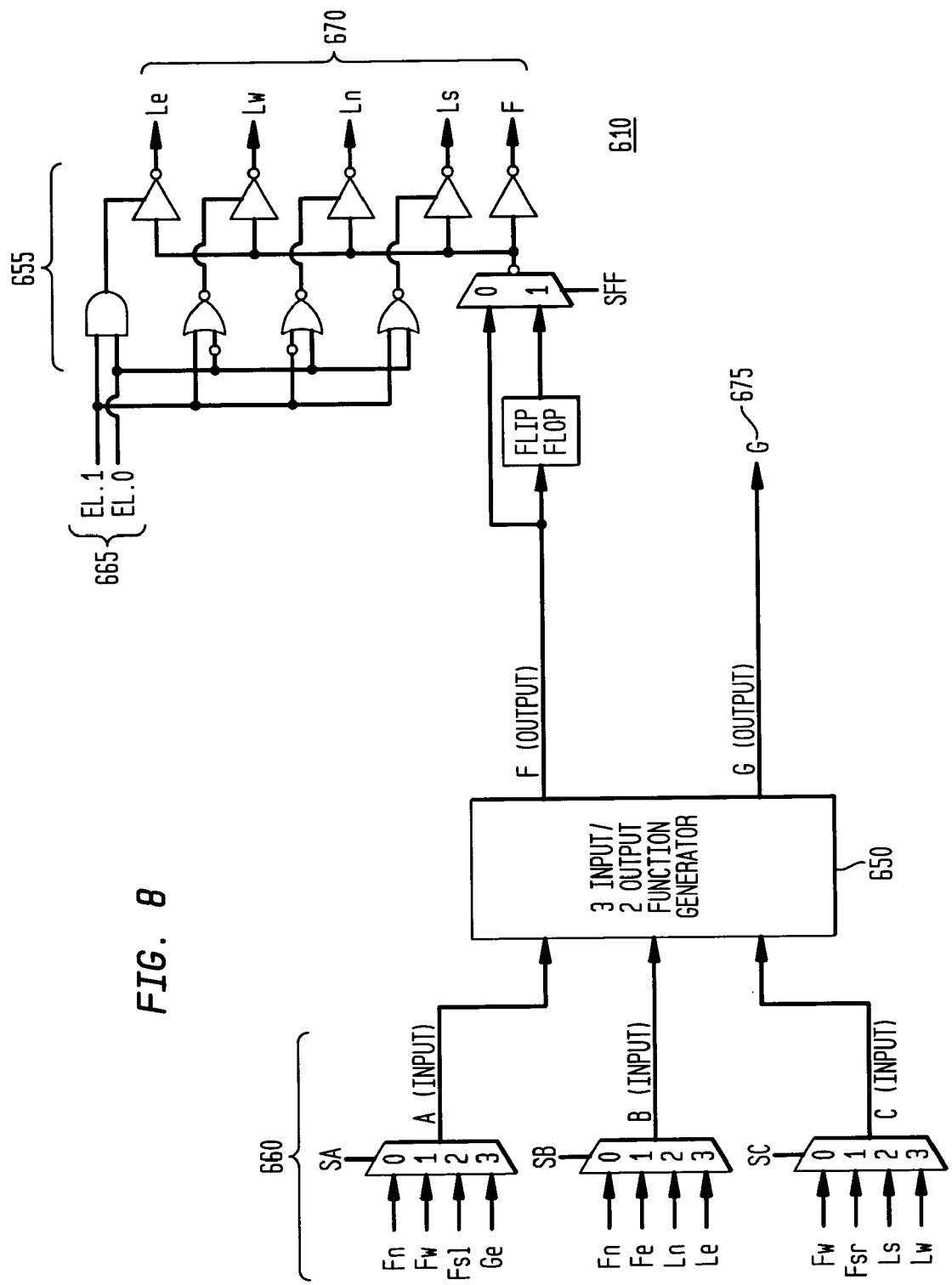
FIG. 8 is a block diagram illustrating, in greater detail, an exemplary core cell of an adaptive logic processor computational unit with a fixed computational element.

FIG. 8 is a block diagram illustrating, in greater detail, an exemplary core cell 610 of an adaptive logic processor computational unit 600 with a fixed computational element 650. The fixed computational element is a 3 input–2 output function generator 550, separately illustrated in FIG. 9. The preferred core cell 610 also includes control logic 655, control inputs 665, control outputs 670 (providing output interconnect), output 675, and inputs (with interconnect muxes) 660 (providing input interconnect).

Figure 9:
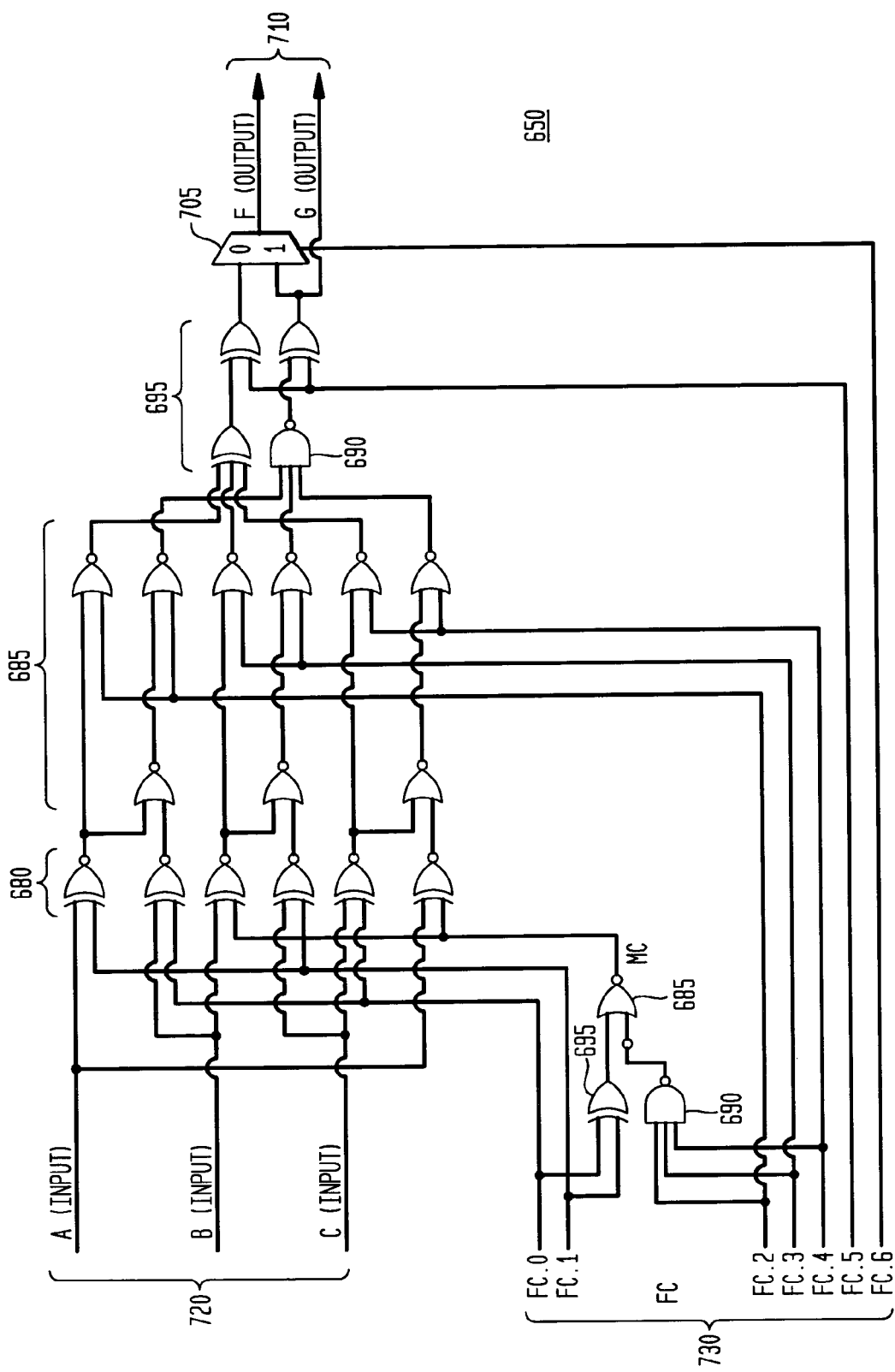
FIG. 9 is a block diagram illustrating, in greater detail, an exemplary fixed computational element of a core cell of an adaptive logic processor computational unit.

FIG. 9 is a block diagram illustrating, in greater detail, an exemplary fixed computational element 650 of a core cell 610 of an adaptive logic processor computational unit 600. The fixed computational element 650 is comprised of a fixed layout of pluralities of exclusive NOR (XNOR) gates 680, NOR gates 685, NAND gates 690, and exclusive OR (XOR) gates 695, with three inputs 720 and two outputs 710. Configuration and interconnection is provided through MUX 705 and interconnect inputs 730.

Figure 10:
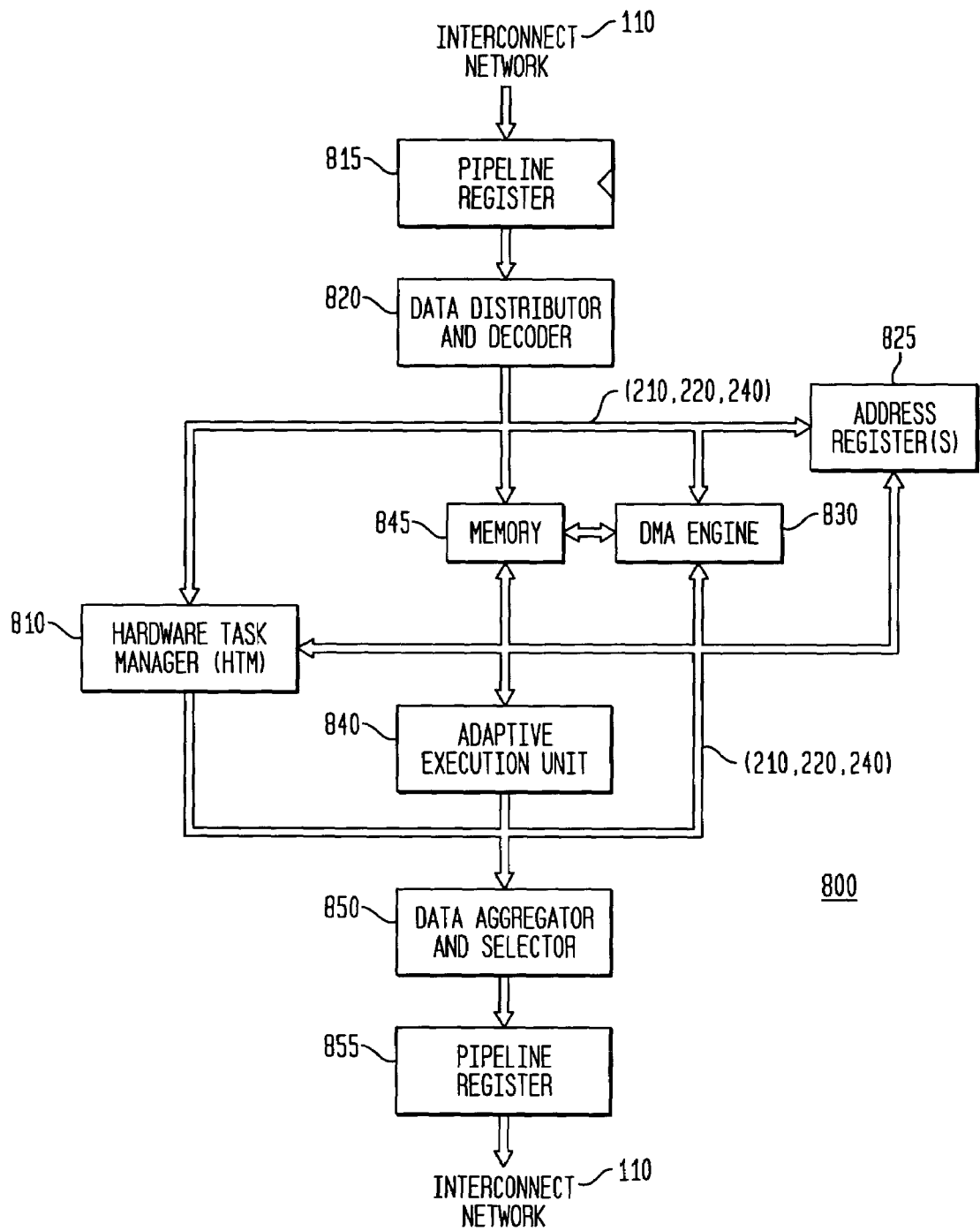
FIG. 10 is a block diagram illustrating a second exemplary apparatus embodiment in accordance with the invention of the related application.

FIG. 10 is a block diagram illustrating a prototypical node or matrix 800 comprising the second apparatus embodiment of the invention of the related application. The node 800 is connected to other nodes 150 within the ACE 100 through the matrix interconnection network 110. The prototypical node 800 includes a fixed (and non-reconfigurable) "node wrapper", an adaptive (reconfigurable) execution unit 840, and a memory 845 (which also may be variable). This fixed and non-reconfigurable "node wrapper" includes an input pipeline register 815, a data decoder and distributor 820, a hardware task manager 810, an address register 825 (optional), a DMA engine 830 (optional), a data aggregator and selector 850, and an output pipeline register 855. These components comprising the node wrapper are generally common to all nodes of the ACE 100, and are comprised of fixed architectures (i.e., application-specific or non-reconfigurable architectures). As a consequence, the node or matrix 800 is a unique blend of fixed, non-reconfigurable node wrapper components, memory, and the reconfigurable components of an adaptive execution unit 840 (which, in turn, are comprised of fixed computational elements and an interconnection network).

Various nodes 800, in general, will have a distinctive and variably-sized adaptive execution unit 840, tailored for one or more particular applications or algorithms, and a memory 845, also implemented in various sizes depending upon the requirements of the adaptive execution unit 840. An adaptive execution unit 840 for a given node 800 will generally be different than the adaptive execution units 840 of the other nodes 800. Each adaptive execution unit 840 is reconfigurable in response to configuration information, and is comprised of a plurality of computation units 200, which in turn further comprised of a plurality of computational elements 250, and corresponding interconnect networks 210, 220 and 240. Particular adaptive execution units 840 utilized in exemplary embodiments, and the operation of the node 800 and node wrapper, are discussed in greater detail below.

Figure 11:
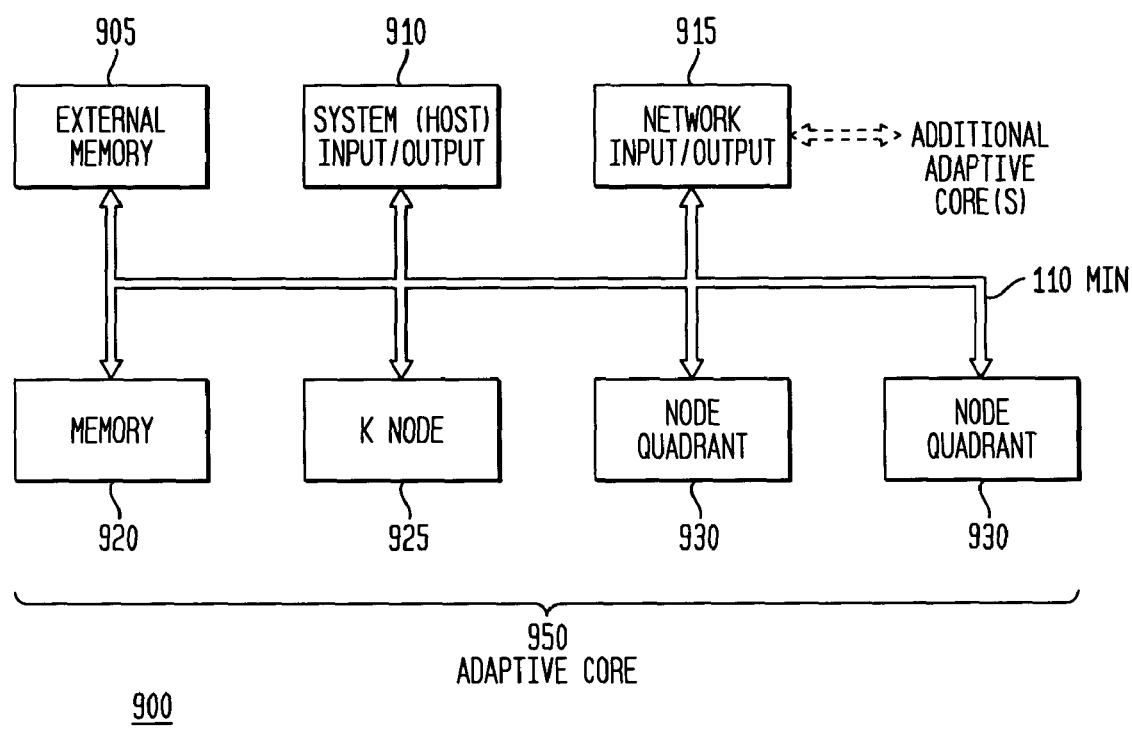
FIG. 11 is a block diagram illustrating an exemplary first system embodiment in accordance with the invention of the related application.

FIG. 11 is a block diagram illustrating a first system embodiment 900 in accordance with the invention of the related application. This first system 900 may be included as part of a larger system or host environment, such as within a computer or communications device, for example. FIG. 11 illustrates a "root" level of such a system 100, where global resources have connectivity (or otherwise may be found). At this root level, the first system 900 includes one or more adaptive cores 950, external (off-IC or off-chip) memory 905 (such as SDRAM), host (system) input and output connections, and network (MIN 110) input and output connections (for additional adaptive cores 950). Each adaptive core 950 includes (on-IC or on-chip) memory 920, a "K-node" 925, and one or more sets of nodes (150, 800) referred to as a node quadrant 930. The K-node 925 (like the kernel controller 150A) provides an operating system for the adaptive core 950.

Generally, each node quadrant 930 consists of 16 nodes in a scalable by-four (×4) fractal arrangement. At this root level, each of these (seven) illustrated elements has total connectivity with all other (six) elements. As a consequence, the output of a root-level element is provided to (and may drive) all other root-level inputs, and the input of each root-level input is provided with the outputs of all other root-level elements. Not separately illustrated, at this root-level of the first system 900, the MIN 110 includes a network with routing (or switching) elements (935), such as round-robin, token ring, cross point switches, or other arbiter elements, and a network (or path) for real time data transfer (or transmission) (such as a data network 240).

Figure 12:
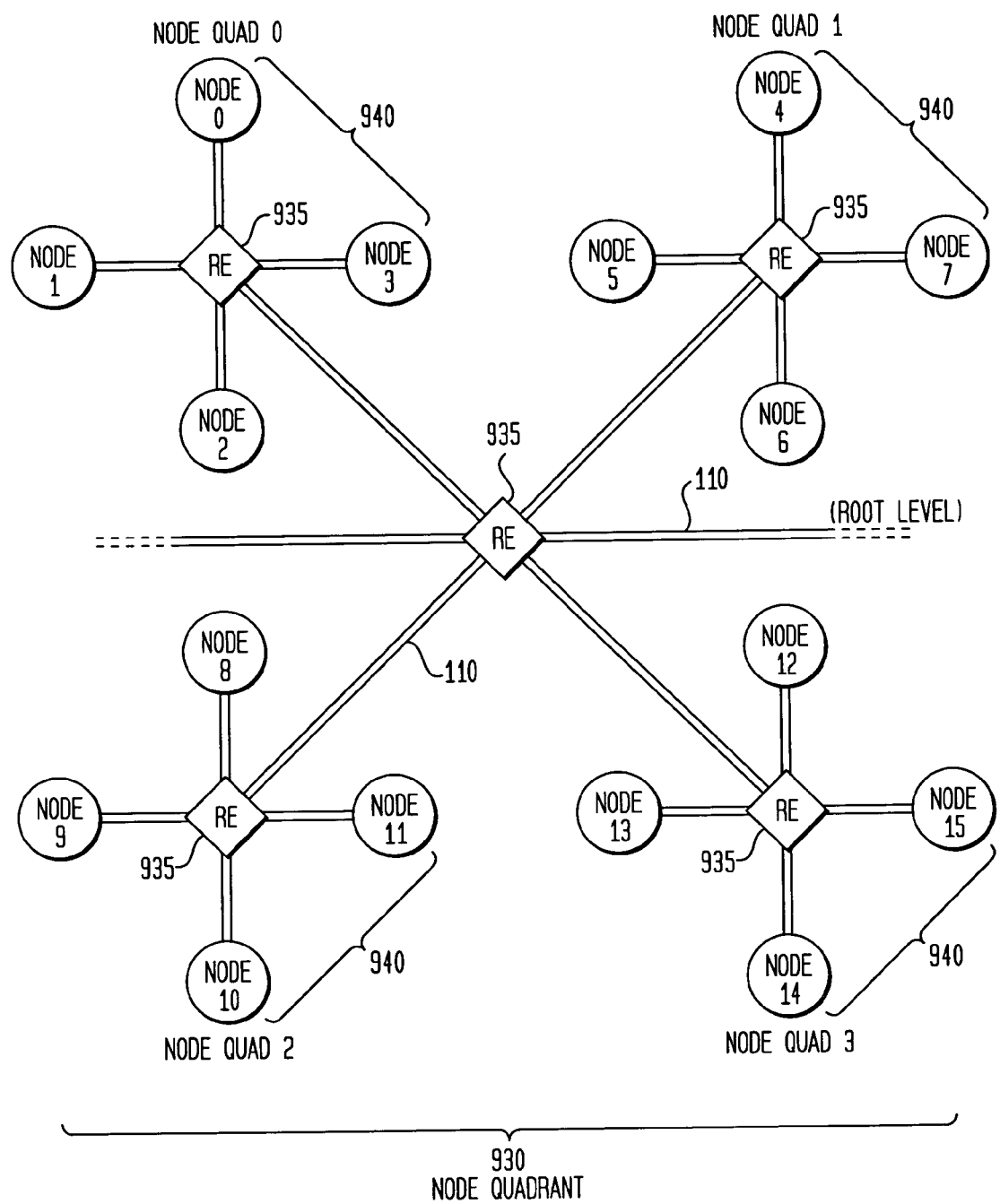
FIG. 12 is a block diagram illustrating an exemplary node quadrant with routing elements.

FIG. 12 is a block diagram illustrating an exemplary node quadrant 930 with routing elements 935. From the root-level, the node quadrant 930 has a tree topology and consists of 16 nodes (150 or 800), with every four nodes connected as a node "quad" 940 having a routing (or switching) element 935. The routing elements may be implemented variously, such as through round-robin, token ring, cross point switches, (four-way) switching, (¼, ⅓ or ½) arbitration or other arbiter or arbitration elements, or depending upon the degree of control overhead which may be tolerable, through other routing or switching elements such as multiplexers and demultiplexers. This by-four fractal architecture provides for routing capability, scalability, and expansion, without logical limitation. The node quadrant 930 is coupled within the first system 900 at the root-level, as illustrated. This by-four fractal architecture also provides for significant and complete connectivity, with the worst-case distance between any node being $\log_4$ of "k" hops (or number of nodes) (rather than a linear distance), and provides for avoiding the overhead and capacitance of, for example, busses or full crossbar switches.

The node quadrant 930 and node quad 940 structures exhibit a fractal self-similarity with regard to scalability, repeating structures, and expansion. The node quadrant 930 and node quad 940 structures also exhibit a fractal self-similarity with regard to a heterogeneity of the plurality of heterogeneous and reconfigurable nodes 800, heterogeneity of the plurality of heterogeneous computation units 200, and heterogeneity of the plurality of heterogeneous computational elements 250. With regard to the increasing heterogeneity, the adaptive computing integrated circuit 900 exhibits increasing heterogeneity from a first level of the plurality of heterogeneous and reconfigurable matrices, to a second level of the plurality of heterogeneous computation units, and further to a third level of the plurality of heterogeneous computational elements. The plurality of interconnection levels also exhibits a fractal self-similarity with regard to each interconnection level of the plurality of interconnection levels. At increasing depths within the ACE 100, from the matrix 150 level to the computation unit 200 level and further to the computational element 250 level, the interconnection network is increasingly rich, providing an increasing amount of bandwidth and an increasing number of connections or connectability for a correspondingly increased level of reconfigurability. As a consequence, the matrix-level interconnection network, the computation unit-level interconnection network, and the computational element-level interconnection network also constitute a fractal arrangement.

Referring to FIGS. 11 and 12, and as explained in greater detail below, the system embodiment 900 utilizes point-to-point service for streaming data and configuration information transfer, using a data packet (or data structure) discussed below. A packet-switched protocol is utilized for this communication, and in an exemplary embodiment the packet length is limited to a length of 51 bits, with a one word (32 bits) data payload, to obviate any need for data buffering. The routing information within the data packet provides for selecting the particular adaptive core 950, followed by selecting root-level (or not) of the selected adaptive core 950, followed by selecting a particular node (110 or 800) of the selected adaptive core 950. This selection path may be visualized by following the illustrated connections of FIGS. 11 and 12. Routing of data packets out of a particular node may be performed similarly, or may be provided more directly, such as by switching or arbitrating within a node 800 or quad 940, as discussed below.

Figure 13:
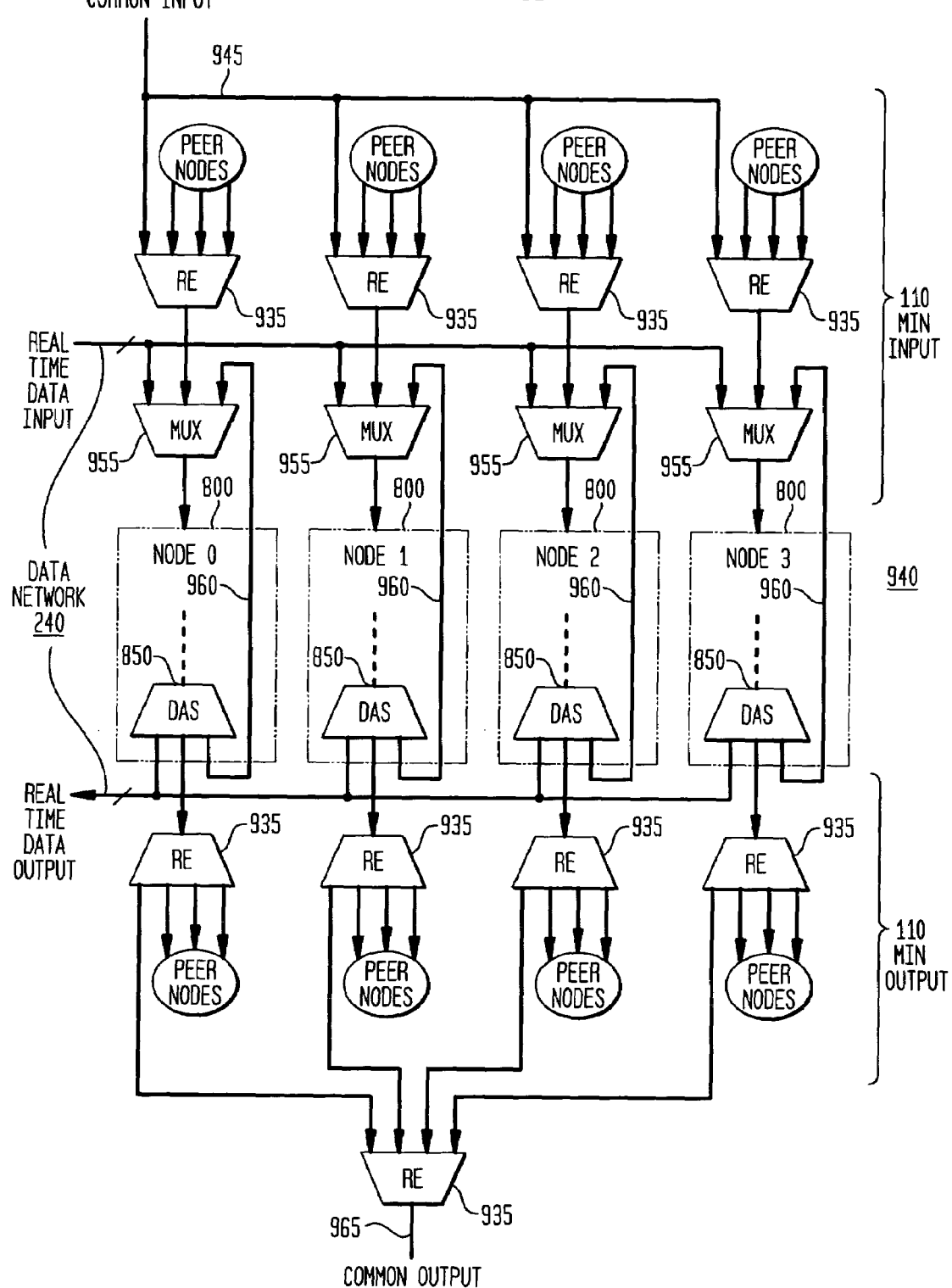
FIG. 13 is a block diagram illustrating exemplary network interconnections.

FIG. 13 is a block diagram illustrating exemplary network interconnections into and out of nodes 800 and node quads 940. Referring to FIG. 13, MIN 100 connections into a node, via a routing element 935, include a common input 945 (provided to all four nodes 800 within a quad 940), and inputs from the other (three) "peer" nodes within the particular quad 940. For example, outputs from peer nodes 1, 2 and 3 are utilized for input into node 0, and so on. At this level, the routing element 935 may be implemented, for example, as a round-robin, token ring, arbiter, cross point switch, or other four-way switching element. The output from the routing element 935 is provided to a multiplexer 955 (or other switching element) for the corresponding node 800, along with a feedback input 960 from the corresponding node 800, and an input for real time data (from data network 240) (to provide a fast track for input of real time data into nodes 800). The multiplexer 955 (or other switching element) provides selection (switching or arbitration) of one of 3 inputs, namely, selection of input from the selected peer or common 945, selection of input from the same node as feedback, or selection of input of real time data, with the output of the multiplexer 955 provided as the network (MIN 110) input into the corresponding node 800 (via the node's pipeline register 815). While not separately illustrated in FIG. 13, it should be noted that the various inputs into the pipeline register 815 of a node 800 and outputs from the pipeline register 855 from a node 800 are each in the form of a bus, preferably a 32-bit parallel bus. Each separate line or input (output) of the (32-bit) bus is referred to herein as a "port", and is assigned a port number (5 bits) which maps to memory 845, which is referred to as a port identifier (or port ID).

The node 800 output is provided to the data aggregator and selector ("DAS") 850 within the node 800, which determines the routing of output information to the node itself (same node feedback), to the network (MIN 110) (for routing to another node or other system element), or to the data network 240 (for real time data output). As indicated above, this output is provided using a 32-bit output bus, with each output port of the bus also referred to using an (output) port identifier. When the output information is selected for routing to the MIN 110, the output from the DAS 850 is provided to the corresponding output routing element 935, which routes the output information to peer nodes within the quad 940 or to another, subsequent routing element 935 for routing out of the particular quad 940 through a common output 965 (such for routing to another node quad 940, node quadrant 930, or adaptive core 950).

Figure 14:
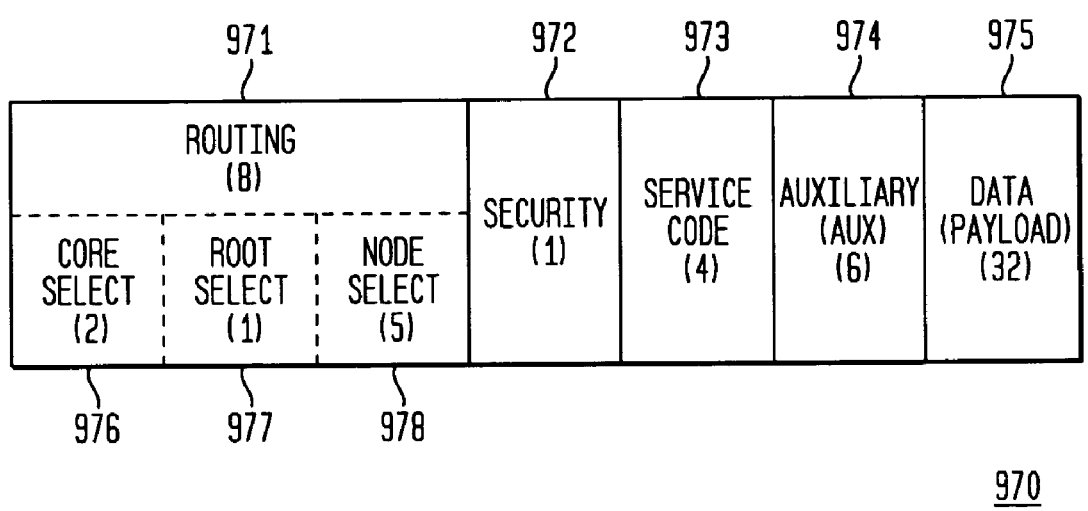
FIG. 14 is a block diagram illustrating an exemplary data structure embodiment.

FIG. 14 is a block diagram illustrating an exemplary data structure embodiment. The system embodiment 900 utilizes point-to-point data and configuration information transfer, using a data packet (as an exemplary data structure) 970, and may be considered as an exemplary form of "silverware", as previously described herein. The exemplary data packet 970 provides for 51 bits per packet, with 8 bits provided for a routing field (971), 1 bit for a security field (972), 4 bits for a service code field (973), 6 bits for an auxiliary field (974), and 32 bits (one word length) for data (as a data payload or data field) (975). As indicated above, the routing field 971 may be further divided into fields for adaptive core selection (976), root selection (977), and node selection (978). In this selected 51-bit embodiment, up to four adaptive cores may be selected, and up to 32 nodes per adaptive core. As the packet is being routed, the routing bits may be stripped from the packet as they are being used in the routing process. The service code field 973 provides for designations such as point-to-point inter-process communication, acknowledgements for data flow control, "peeks" and "pokes" (as coined terminology referring to reads and writes by the K-node into memory 845), DMA operations (for memory moves), and random addressing for reads and writes to memory 845. The auxiliary (AUX) field 974 supports up to 32 streams for any of up to 32 tasks for execution on the adaptive execution unit

840, as discussed below, and may be considered to be a configuration information payload. The one word length (32-bit) data payload is then provided in the data field 975. The exemplary data structure 970 (as a data packet) illustrates the interdigitation of data and configuration/control information, as discussed above.

Referring to FIG. 10, in light of the first system 900 structure and data structure discussed above, the node 800 architecture of the second apparatus embodiment may be described in more detail. The input pipeline register 815 is utilized to receive data and configuration information from the network interconnect 110, through a plurality of input ports. Preferably, the input pipeline register 815 does not permit any data stalls. More particularly, in accordance with the data flow modeling, the input pipeline register 815 should accept new data from the interconnection network 110 every clock period; consequently, the data should also be consumed as it is produced. This imposes the requirement that any contention issues among the input pipeline register 815 and other resources within the node 800 be resolved in favor of the input pipeline register 815, i.e., input data in the input pipeline register has priority in the selection process implemented in various routing (or switching) elements 935, multiplexers 955, or other switching or arbitration elements which may be utilized.

The data decoder and distributor 820 interfaces the input pipeline register 815 to the various memories (e.g., 845) and registers (e.g., 825) within the node 800, the hardware task manager 810, and the DMA engine 830, based upon the values in the service and auxiliary fields of the 51-bit data structure. The data decoder 820 also decodes security, service, and auxiliary fields of the 51-bit network data structure (of the configuration information or of operand data) to direct the received word to its intended destination within the node 800.

Conversely, data from the node 800 to the network (MIN 110 or to other nodes) is transferred through a plurality of output ports via the output pipeline register 855, which holds data from one of the various memories (845) or registers (e.g., 825 or registers within the adaptive execution unit 840) of the node 800, the adaptive execution unit 840, the DMA engine 830, and/or the hardware task manager 810. Permission to load data into the output pipeline register 855 is granted by the data aggregator and selector (DAS) 850, which arbitrates or selects between and among any competing demands of the various (four) components of the node 800 (namely, requests from the hardware task manager 810, the adaptive execution unit 840, the memory 845, and the DMA engine 830). The data aggregator and selector 850 will issue one and only one grant whenever there is one or more requests and the output pipeline register 855 is available. In the selected embodiment, the priority for issuance of such a grant is, first, for K-node peek (read) data; second, for the adaptive execution unit 840 output data; third, for source DMA data; and fourth, for hardware task manager 810 message data. The output pipeline register 855 is available when it is empty or when its contents will be transferred to another register at the end of the current clock cycle.

The DMA engine 830 of the node 800 is an optional component. In general, the DMA engine 830 will follow a five register model, providing a starting address register, an address stride register, a transfer count register, a duty cycle register, and a control register. The control register within the DMA engine 830 utilizes a GO bit, a target node number and/or port number, and a DONE protocol. The K-node 925 writes the registers, sets the GO bit, and receives a DONE message when the data transfer is complete. The DMA engine 830 facilitates block moves from any of the memories of the node 800 to another memory, such as an on-chip bulk memory, external SDRAM memory, another node's memory, or a K-node memory for diagnostics and/or operational purposes. The DMA engine 830, in general, is controlled by the K-node 925.

The hardware task manager 810 is configured and controlled by the K-node 925 and interfaces to all node components except the DMA engine 830. The hardware task manager 810 executes on each node 800, processing a task list and producing a task ready-to-run queue implemented as a first in—first out (FIFO) memory. The hardware task manager 810 has a top level finite state machine that interfaces with a number of subordinate finite state machines that control the individual hardware task manager components. The hardware task manager 810 controls the configuration and reconfiguration of the computational elements 250 within the adaptive execution unit 840 for the execution of any given task by the adaptive execution unit 840.

The K-node 925 initializes the hardware task manager 810 and provides it with set up information for the tasks needed for a given operating mode, such as operating as a communication processor or an MP3 player. The K-node 925 provides configuration information as stored tasks (i.e., stored tasks or programs) within memory 845 and within local memory within the adaptive execution unit 840. The K-node 925 initializes the hardware task manager 810 (as a parameter table) with designations of input ports, output ports, routing information, the type of operations (tasks) to be executed (e.g., FFT, DCT), and memory pointers. The K-node 925 also initializes the DMA engine 830.

The hardware task manager 810 maintains a port translation table and generates addresses for point-to-point data delivery, mapping input port numbers to a current address of where incoming data should be stored in memory 845. The hardware task manager 810 provides data flow control services, tracking both production and consumption of data, using corresponding production and consumption counters, and thereby determines whether a data buffer is available for a given task. The hardware task manager 810 maintains a state table for tasks and, in the selected embodiment, for up to 32 tasks. The state table includes a GO bit (which is enabled or not enabled (suspended) by the K-node 925), a state bit for the task (idle, ready-to-run, run (running)), an input port count, and an output port count (for tracking input data and output data). In the selected embodiment, up to 32 tasks may be enabled at a given time. For a given enabled task, if its state is idle, and if sufficient input data (at the input ports) are available and sufficient output ports are available for output data, its state is changed to ready-to-run and queued for running (transferred into a ready-to-run FIFO or queue). Typically, the adaptive execution unit 840 is provided with configuration information (or code) and two data operands (x and y).

From the ready-to-run queue, the task is transferred to an active task queue, the adaptive execution unit 840 is configured for the task (set up), the task is executed by the adaptive execution unit 840, and output data is provided to the data aggregator and selector 850. Following this execution, the adaptive execution unit 840 provides an acknowledgement message to the hardware task manager 810, requesting the next item. The hardware task manager 810 may then direct the adaptive execution unit 840 to continue to process data with the same configuration in place, or to tear down the current configuration, acknowledge completion of the tear down and request the next task from the ready-to-run queue. Once configured for execution of a selected algorithm, new configuration information is not needed from the hardware task manager 810, and the adaptive execution unit 840 functions effectively like an ASIC, with the limited additional overhead of acknowledgement messaging to the hardware task manager 810. These operations are described in additional detail below.

A module is a self-contained block of code (for execution by a processor) or a hardware-implemented function (embodied as configured computational elements 250), which is processed or performed by an execution unit 840. A task is an instance of a module, and has four states: suspend, idle, ready or run. A task is created by associating the task to a specific module (computational elements 250) on a specific node 800; by associating physical memories and logical input buffers, logical output buffers, logical input ports and logical output ports of the module; and by initializing configuration parameters for the task. A task is formed by the K-node writing the control registers in the node 800 where the task is being created (i.e., enabling the configuration of computational elements 250 to perform the task), and by the K-node writing to the control registers in other nodes, if any, that will be producing data for the task and/or consuming data from the task. These registers are memory mapped into the K-node's address space, and "peek and poke" network services are used to read and write these values. A newly created task starts in the "suspend" state.

Once a task is configured, the K-node can issue a "go" command, setting a bit in a control register in the hardware task manager 810. The action of this command is to move the task from the "suspend" state to the "idle" state. When the task is "idle" and all its input buffers and output buffers are available, the task is added to the "ready-to-run" queue which is implemented as a FIFO; and the task state is changed to "ready/run". Buffers are available to the task when subsequent task execution will not consume more data than is present in its input buffers or will not produce more data than there is capacity in its output buffers.

When the adaptive execution unit 840 is not busy and the FIFO is not empty, the task number for the next task that is ready to execute is removed from the FIFO, and the state of this task is "run". In the "run" state, the task (executed by the configured adaptive execution unit 840) consumes data from its input buffers and produces data for its output buffers.

The adaptive execution units 840 will vary depending upon the type of node 800 implemented. Various adaptive execution units 840 may be specifically designed and implemented for use in heterogeneous nodes 800, for example, for a programmable RISC processing node; for a programmable DSP node; for an adaptive or reconfigurable node for a particular domain, such as an arithmetic node; and for an adaptive bit-manipulation unit (RBU). Various adaptive execution units 840 are discussed in greater detail below.

For example, a node 800, through its execution unit 840, will perform an entire algorithmic element in a comparatively few clock cycles, such as one or two clock cycles, compared to performing a long sequence of separate operations, loads/stores, memory fetches, and so on, over many hundreds or thousands of clock cycles, to eventually achieve the same end result. Through its computational elements 250, the execution unit 840 may then be reconfigured to perform another, different algorithmic element. These algorithmic elements are selected from a plurality of algorithmic elements comprising, for example: a radix-2 Fast Fourier Transformation (FFT), a radix-4 Fast Fourier Transformation (FFT), a radix-2 Inverse Fast Fourier Transformation (IFFT), a radix-4 Inverse Fast Fourier Transformation (IFFT), a one-dimensional Discrete Cosine Transformation (DCT), a multi-dimensional Discrete Cosine Transformation (DCT), finite impulse response (FIR) filtering, convolutional encoding, scrambling, puncturing, interleaving, modulation mapping, Golay correlation, OVSF code generation, Haddamard Transformation, Turbo Decoding, bit correlation, Griffiths LMS algorithm, variable length encoding, uplink scrambling code generation, downlink scrambling code generation, downlink despreading, uplink spreading, uplink concatenation, Viterbi encoding, Viterbi decoding, cyclic redundancy coding (CRC), complex multiplication, data compression, motion compensation, channel searching, channel acquisition, and multipath correlation.

In an exemplary embodiment, a plurality of different nodes 800 are created, by varying the type and amount of computational elements 250 (forming computational units 200), and varying the type, amount and location of interconnect (with switching or routing elements) which form the execution unit 840 of each such node 800. In the exemplary embodiment, two different nodes 800 perform, generally, arithmetic or mathematical algorithms, and are referred to as adaptive (or reconfigurable) arithmetic nodes (AN), as AN1 and AN2. For example, the AN1 node, as a first node 800 of the plurality of heterogeneous and reconfigurable nodes, comprises a first selection of computational elements 250 from the plurality of heterogeneous computational elements to form a first reconfigurable arithmetic node for performance of Fast Fourier Transformation (FFT) and Discrete Cosine Transformation (DCT). Continuing with the example, the AN2 node, as a second node 800 of the plurality of heterogeneous and reconfigurable nodes, comprises a second selection of computational elements 250 from the plurality of heterogeneous computational elements to form a second reconfigurable arithmetic node, the second selection different than the first selection, for performance of at least two of the following algorithmic elements: multi-dimensional Discrete Cosine Transformation (DCT), finite impulse response (FIR) filtering, OVSF code generation, Haddamard Transformation, bit-wise WCDMA Turbo interleaving, WCDMA uplink concatenation, WCDMA uplink repeating, and WCDMA uplink real spreading and gain scaling.

Also in the exemplary embodiment, a plurality of other types of nodes 800 are defined, such as, for example:

A bit manipulation node, as a third node of the plurality of heterogeneous and reconfigurable nodes, comprising a third selection of computational elements 250 from the plurality of heterogeneous computational elements, the third selection different than the first selection, for performance of at least two of the following algorithmic elements: variable and multiple rate convolutional encoding, scrambling code generation, puncturing, interleaving, modulation mapping, complex multiplication, Viterbi algorithm, Turbo encoding, Turbo decoding, correlation, linear feedback shifting, downlink despreading, uplink spreading, CRC encoding, de-puncturing, and de-repeating.

A reconfigurable filter node, as a fourth node of the plurality of heterogeneous and reconfigurable nodes, comprising a fourth selection of computational elements 250 from the plurality of heterogeneous computational elements, the fourth selection different than the first selection, for performance of at least two of the following algorithmic elements: adaptive finite impulse response (FIR) filtering, Griffith's LMS algorithm, and RRC filtering.

A reconfigurable finite state machine node, as a fifth node of the plurality of heterogeneous and reconfigurable nodes, comprising a fifth selection of computational elements 250 from the plurality of heterogeneous computational elements, the fifth selection different than the first selection, for performance of at least two of the following processes: control processing; routing data and control information between and among the plurality of heterogeneous computational elements 250; directing and scheduling the configuration of the plurality of heterogeneous computational elements for performance of a first algorithmic element and the reconfiguration of the plurality of heterogeneous computational elements for performance of a second algorithmic element; timing and scheduling the configuration and reconfiguration of the plurality of heterogeneous computational elements with corresponding data; controlling power distribution to the plurality of heterogeneous computational elements and the interconnection network; and selecting the first configuration information and the second configuration information from a singular bit stream comprising data commingled with a plurality of configuration information.

A reconfigurable multimedia node, as a sixth node of the plurality of heterogeneous and reconfigurable nodes, comprising a sixth selection of computational elements 250 from the plurality of heterogeneous computational elements, the sixth selection different than the first selection, for performance of at least two of the following algorithmic elements: radix-4 Fast Fourier Transformation (FFT); multi-dimensional radix-2 Discrete Cosine Transformation (DCT); Golay correlation; adaptive finite impulse response (FIR) filtering; Griffith's LMS algorithm; and RRC filtering.

A reconfigurable hybrid node, as a seventh node of the plurality of heterogeneous and reconfigurable nodes, comprising a seventh selection of computational elements 250 from the plurality of heterogeneous computational elements, the seventh selection different than the first selection, for performance of arithmetic functions and bit manipulation functions.

A reconfigurable input and output (I/O) node, as an eighth node of the plurality of heterogeneous and reconfigurable nodes, comprising an eighth selection of computational elements 250 from the plurality of heterogeneous computational elements, the eighth selection different than the first selection, for adaptation of input and output functionality for a plurality of types of I/O standards, the plurality of types of I/O standards comprising standards for at least two of the following: PCI busses, Universal Serial Bus types one and two (USB1 and USB2), and small computer systems interface (SCSI).

A reconfigurable operating system node, as a ninth node of the plurality of heterogeneous and reconfigurable nodes, comprising a ninth selection of computational elements 250 from the plurality of heterogeneous computational elements, the ninth selection different than the first selection, for storing and executing a selected operating system of a plurality of operating systems.

Figure 15:
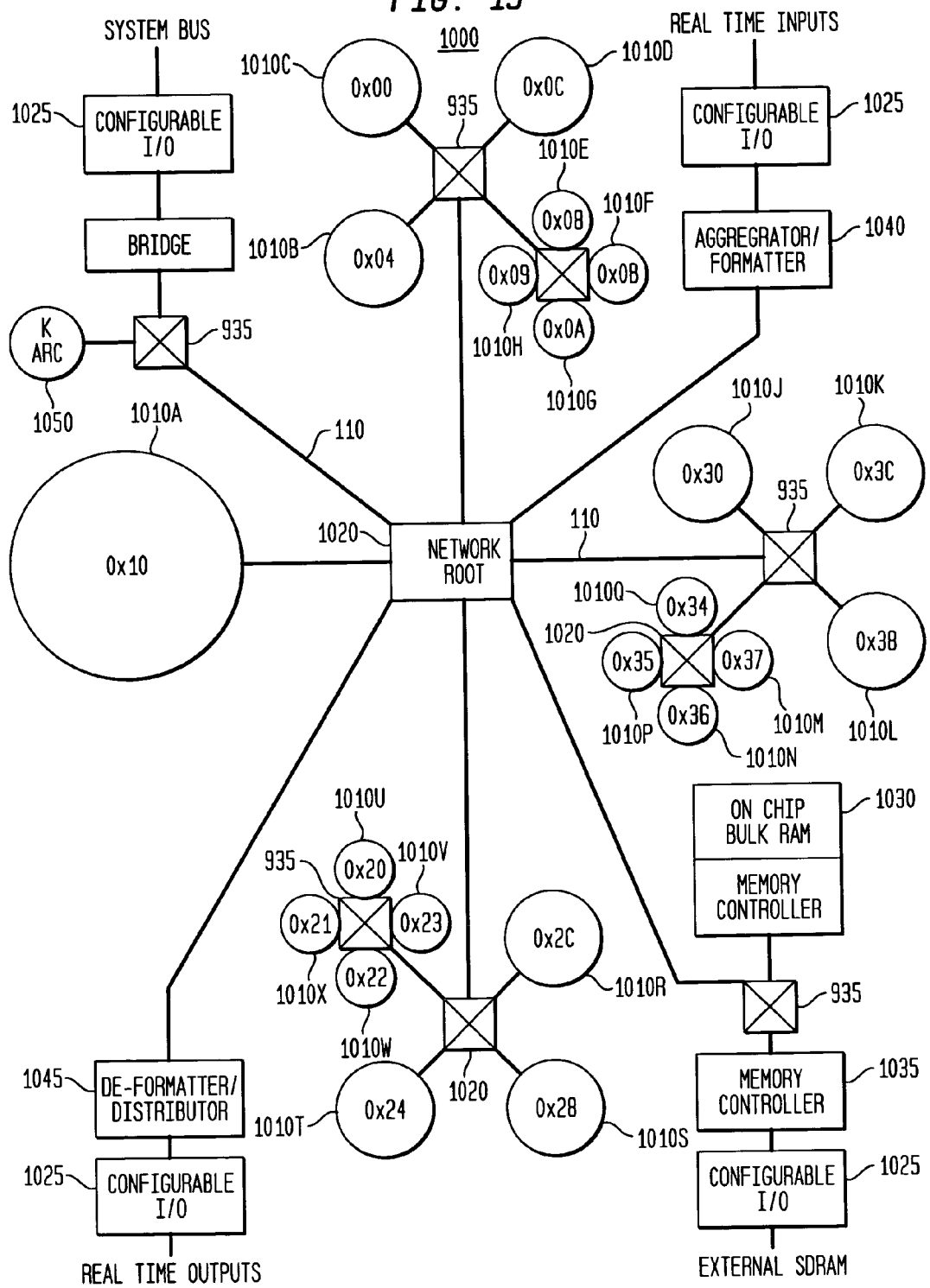
FIG. 15 is a block diagram illustrating an exemplary second system embodiment 1000 in accordance with the invention of the related application.

FIG. 15 is a block diagram illustrating a second system embodiment 1000 in accordance with the invention of the related application. The second system embodiment 1000 is comprised of a plurality of variably-sized nodes (or matrices) 1010 (illustrated as nodes 1010A through 1010X), with the illustrated size of a given node 1010 also indicative of an amount of computational elements 250 within the node 1010 and an amount of memory included within the node 1010 itself. The nodes 1010 are coupled to an interconnect network 110, for configuration, reconfiguration, routing, and so on, as discussed above. The second system embodiment 1000 illustrates node 800 and system configurations which are different and more varied than the quadrant 930 and quad 940 configurations discussed above.

As illustrated, the second system embodiment 1000 is designed for use with other circuits within a larger system and, as a consequence, includes configurable input/output (I/O) circuits 1025, comprised of a plurality of heterogeneous computational elements configurable (through corresponding interconnect, not separately illustrated) for I/O functionality. The configurable input/output (I/O) circuits 1025 provide connectivity to and communication with a system bus (external), external SDRAM, and provide for real time inputs and outputs. A K-node (KARC) 1050 provides the K-node (KARC) functionality discussed above. The second system embodiment 1000 further includes memory 1030 (as on-chip RAM, with a memory controller), and a memory controller 1035 (for use with the external memory (SDRAM)). Also included in the apparatus 1000 are an aggregator/formatter 1040 and a de-formatter/distributor 1045, providing functions corresponding to the functions of the data aggregator and selector 850 and data distributor and decoder 820, respectively, but for the larger system 1000 (rather than within a node 800).

As indicated above, one of the novel aspects of the ACE architecture is its heterogeneous collection of nodes 150, 800, which communicate via the matrix interconnection network (MIN) 110. The MIN 110 architecture allows data to be transmitted between tasks running on pairs of nodes 150, 800 (or between pairs of tasks on the same node), with one task acting as the producer of the data, and the other as the consumer. The producing task will provide data through one or more output ports coupled to the MIN 110, via pipeline register 855 (for immediate consumption by a consuming task). The consuming task will receive data through one or more input ports coupled to the MIN 110, via pipeline register 815. These pairs of tasks can be configured either statically at the time of device initialization, or reconfigured dynamically. The minimal information required to statically or dynamically reconfigure a MIN 110 connection consists of the following:

1. A source node identifier which uniquely identifies the node 150, 800 on which the task producing the data resides.
2. A source task identifier which uniquely identifies which task on the source node is acting as the producer.
3. A source port identifier which uniquely identifies which (output) port on the source node is being used to transmit information onto the MIN 110.
4. A target node identifier which uniquely identifies the node 150, 800 on which the task consuming the data resides.
5. A target task identifier which uniquely identifies which task on the target node is acting as the consumer.
6. A target port identifier which uniquely identifies which (input) port on the target node is being used to gather information from the MIN 110.

As mentioned above, the nodes of the ACE are heterogeneous in nature, meaning their internal architectures differ from one another, allowing each node to optimize its performance for differing computational types. A feature common to all nodes is the Hardware Task Manager (HTM) 810, a component of the node that is responsible for interacting with the MIN 110. The HTM 810 is also responsible for keeping track of the tasks running on each node, and controlling when each task executes.

The HTM 810 employs a technique known as co-operative multitasking to control task scheduling. In a co-operatively multitasked system, only one task is allowed to execute on a node 150, 800 at any given time. It is the running task's responsibility to yield the processor back to the Hardware Task Manager when it has completed its computation.

In order to efficiently schedule tasks, the HTM associates firing conditions with each task. These firing conditions are based on the availability of input data for a task to consume, and the availability of memory to store output data produced by a task. These firing conditions are represented as counters in a Consumer Count Table (CCT) and Producer Count Table (PCT).

The minimal information required to statically or dynamically configure a node's HTM 810 to specify task firing conditions consists of the following:
1. A task identifier.
2. The number of input ports utilized by the task.
3. For each input port, the counter value required to trigger the task.
4. For each input port, the initial counter value.
5. The number of output ports utilized by the task.
6. For each output port, the counter value required to trigger the task.
7. For each output port, the initial counter value.

In accordance with the present invention, a new general purpose programming language (referred to herein as "SilverC") is provided to facilitate static and dynamic configuration of the ACE 100. While applicable to many hardware platforms and programming styles, it contains several constructs that directly support the static or dynamic reconfiguration of the MIN 110 and HTMs 810 of the ACE (ACM) 100. These constructs are modules, processes, and pipes.

A "construct" or "program construct", as used herein, means and refers to use of any programming language, of any kind, with any syntax or signatures, which provide or can be interpreted to provide a mapping or correspondence from the language to the hardware, such as a first program construct which maps to a node 800, a second program construct which maps to a task to executed on the node 800, and so on. While exemplary constructs are illustrated as examples, it should be understood that other constructs which are correspondingly mapped or can be interpreted to be mapped, such as through a compiler, are within the scope of the present invention. For example, while terminology such as "module", "process", "pipes", etc., are utilized herein, other nomenclature such as "crates", "methods", "conduits", etc. may be utilized, literally or equivalently, provided that a compiler will interpret this nomenclature to be mapped to the adaptive hardware.

A SilverC module acts as a container for program instructions and data that will be used to perform some computation on some hardware platform, such as a node within the ACE (ACM) 100. In the preferred SilverC embodiment, a module corresponds to or maps to a selected node 800. A SilverC module may contain zero or more processes and pipes. SilverC modules add a layer of encapsulation to the SilverC programming language. A module may be completely described by the input and output characteristics of its pipes. As such, developers incorporating a pre-existing module into their application may remain unaware of the details of its processes and how the actual computation is performed within the module.

A SilverC process is a collection of program instructions and data that is instantiated as an individual thread or task on some hardware platform, such as the ACE (ACM) 100. In the preferred SilverC embodiment, a process corresponds to or maps to a task to be performed by the adaptive execution unit (AEU) 840 under the control of the HTM 810 on a selected node 800. The process will only execute when its firing conditions are met, providing event-driven programming. A process maps as a software analog to the hardware task, with the firing conditions mapping to the HTM 810 which provides that a task is ready-to-run when the input data is available and there are a sufficient number of output ports for the output data, as discussed above in greater detail. Multiple processes may be aggregated within a single SilverC module and work cooperatively in order to perform the overall computation of that module.

A SilverC pipe represents communication between tasks, and acts as a conduit for data that is either produced or consumed by a process. An inpipe acts as a conduit for data that is consumed by a process. An outpipe acts as a conduit for data that is produced by a process.

While suitable as a general purpose programming language that is applicable to many hardware platforms, the language constructs of SilverC directly support the static and dynamic reconfiguration capabilities of the ACE (ACM) 100 hardware. In particular, the SilverC module, process and pipe constructs are an efficient means to specify the static and dynamic reconfiguration parameters of the MIN 110 and HTM 810.

The various modules, with their processes, pipes, and other SilverC constructs described below, may then be compiled to a bit file or other object code, by a compiler, for execution on the selected computing hardware, such as a bit file which provides configuration information (silverware) for execution on the ACE (ACM) 100. In the preferred SilverC embodiment, such compilation and resulting bit file may vary depending upon the particular node types available in the selected ACE 100 embodiment. As a consequence, any module, with its processes, pipes, and other SilverC constructs of the preferred SilverC embodiment, is considered capable of being mapped or otherwise has a direct (1:1) correspondence to a selected node 800 of an ACE 100 (and associated system) with its associated HTM 810, AEU 840, and MIN 110 connections (ports).

SilverC modules are code containers that are mapped (by a compiler) to a single "execution unit" having computational elements on some hardware platform, such as to a node 800 on the ACE (ACM) 100 having an AEU 840 and HTM 810. The computational elements of the AEU 840 may support multiple modules at a time, but a module should not be distributed across multiple AEUs 840 (i.e., a single module is executed by a single node 800). SilverC modules contain a configuration-time interface and a run-time interface. The configuration-time interface consists of values that are used to parameterize the definition of the module and which are specified at the point when the module is instantiated. For example, a filter may be defined to have a gain parameter of "T", which may be instantiated to provide "T=2", resulting in a filter having a gain of 2 in that instantiation, while at another time, may be instantiated to provide "T=3", resulting in a filter having a gain of 3 in that instantiation. Such instantiation may occur at either compile-time or run-time. The run-time interface consists of input and output pipes that are used to dynamically transmit data to and from the module. These form the basis for the SilverC dataflow-style semantics.

SilverC modules are also composed of processes that define the computation performed by the module on its input data. The code used to specify these processes can be C-like in nature, with some additions to support dataflow-style programming and specific hardware features. Equivalently, other coding languages and styles may be utilized, also with the additions to support dataflow-style programming and specific hardware features of the ACE 100.

SilverC modules may contain constants that are global to the module, as well as some amount of state information shared between its processes, in the form of memory or registers. For example, memory may be shared across processes, and variables and constants may be declared and shared across processes.

An exemplary syntax for declaring a typical module is (Example 1):

```
[nodeType] module moduleName[<parameterList>] {
    ...
}
```

In this code fragment of Example 1, the nodeType specifies for which type of node (or AEU 840) the module is targeted, such as an arithmetic node or a bit-manipulation node. (In the examples which follow, a module's nodeType will generally be omitted, for ease of discussion). The moduleName is a placeholder for a unique identifier (or name) that identifies the module, while parameterList represents the list of configuration-time parameters for the module. The parameter list of a module is preferably a comma-separated list of const identifier declarations, resembling a parameter list of a C function. For example, an exemplary parameter list would be (Example 2):

const int16 blockSize, const fract16 epsilon

Modules that require no configuration-time parameters may be declared by omitting the parameter list, and optionally by omitting the angle brackets used to enclose it as well. For example, both of the following modules have no parameters (Example 3):

```
module NoParametersHere<> {
    ...
}
module NorHere {
    ...
}
```

The rest of the module definition is given in one or more module sections.

The preferred SilverC embodiment currently supports four different module sections, each identified by a keyword followed by a colon: constants, state, pipes, and processes. The constants section is used to define constant values that are global to the module. The state section declares shared state information between the module processes. The pipes section defines the module run-time interface. The processes section defines the processes themselves (i.e., algorithms to be performed).

Module sections may appear in any order, though each may only be defined in terms of identifiers declared in sections that precede it. Each module section type may be omitted, may contain no declarations at all, or may be used multiple times within a module. Modules whose pipes and/or processes sections are omitted or empty are relatively useless in a real system.

Each of these module sections is described in further detail below. An exemplary module (named "Sample", and omitting its nodeType) that has one instance of each type of module section is shown in the following code (Example 4):

```
module Sample<const int16 blockSize> {
    constants:
        ...
    state:
        ...
    pipes:
        ...
    processes:
        ...
}
```

In Example 4, a parameter "blockSize" was declared as a constant value of a 16-bit integer data type. As illustrated below, it will be used to determine the size of pipes (number of ports) and the amount of data to be consumed or produced in this module, and will be instantiated by other parts of the code of the module illustrated in other examples below. While illustrating a single parameter, it should be understood that a list of multiple parameters may be utilized.

The constants section of a module is used to declare constants that are global to the module scope. It consists of traditional constant variable declarations as in C, the initializers of which may be composed of any expression formed of literals, global constants defined at the file scope, the parameters of the module, and any module constants declared previously within the module. Module constants are often used to define the sizes of the input pipe buffers, as well as state variables declared within the state section. A sample constants section is illustrated in the following code (Example 5):

```
module Sample<const int16 blockSize> {
    constants:
        const int16 numBlocks = 2;
        const int16 dataCacheSize = numBlocks * blockSize;
    ...
}
```

This state section of a module is used to declare shared state information between module processes. It supports the declaration of global variables within the module scope whose values can be accessed by any of the module processes. If a module is instantiated multiple times, each instantiation receives its own copy of the state variables—in this sense, state variables are similar to the static variables declared within a process except that they are accessible by multiple processes.

Because module processes are cooperatively multi-tasked, there is generally no need for locking or synchronization mechanisms to ensure coherent access to state variables. The variables declared within this section are often arrays of values stored in memory, whose sizes are specified by the module parameters and/or constant declarations, and which values may be shared between processes. The following code shows an exemplary state section for a module (the constants section was shown previously) (Example 6):

```
module Sample<const int16 blockSize> {
    ...
    state:
        ram fract16 dataCache[dataCacheSize];
    ...
}
```

In this Example 6, the state section set up random access memory (ram) (or another register), with a 16-bit fractional (fixed point) data type, having a size (dataCache) equal to the previously determined constant (dataCacheSize).

The pipes section defines the run-time interface of a module by specifying the input and output pipes used to transmit data into and out of the module, and is utilized to configure the MIN 110. For the preferred ACE 100 embodiment, this pipes construct illustrates a 1:1 correspondence between the constructs of SilverC and the configuration of the ACE 100.

All pipes are declared to be either an input pipe, using the inpipe keyword, or an output pipe, using the outpipe keyword. Each pipe type takes its defining parameters enclosed in angle brackets, and these are described in further detail below. Pipes are named, as with any other declaration. A sample pipes section is illustrated as the following code (Example 7):

```
module Sample<const int16 blockSize> {
    ...
    pipes:
        inpipe<...> dataIn;
        outpipe<...> dataOut;
    ...
}
```

In this Example 7, an inpipe has been named dataIn, and an outpipe has been named dataOut. This pipes section specifies that the module has one input data stream that is stored in the dataIn pipe and a single output data stream that is controlled by the dataOut pipe.

Input pipes buffer data that is streamed into a module. All input pipes can be thought of as single-dimensional arrays of a user-specified element type. Input pipes are uniquely named (inpipeName) and are parameterized using two values: the type of element that is being transferred (elementType), and the number of elements that should be buffered by the input pipe (bufferSize) (i.e., the amount of memory to be reserved for its incoming data). An exemplary input pipe declaration is shown as the following code (Example 8):

inpipe<elementType, bufferSize>inpipeName;

In the exemplary module below, an input pipe named dataIn of fract16 data type values is declared whose buffer size is specified via its module parameter (blockSize) and constant values (numBlocks) as follows (Example 9):

```
module Sample<const int16 blockSize> {
    ...
    pipes:
        inpipe<fract16, numBlocks*blocksize> dataIn;
    ...
}
```

As illustrated, whenever this inpipe is instantiated via instantiation of its parent module, different parameter values may be utilized, and the inpipe buffer allocation will be correspondingly sized automatically, providing for significant code re-use.

For an instantiation of this module with a blockSize parameter of "8", this declaration would result in the allocation of logical buffer space corresponding to sixteen (2*8) fract16 elements. The memory allocated by an inpipe declaration can be thought of as being equivalent to the following C array declaration:

elementType inpipeName[bufferSize];

Output pipes are the means for generating output from a module. Output pipes are similar to input pipes, except that they do not perform any buffering, requiring only a data type declaration (elementType) and a unique name (outpipeName). As discussed above, as soon as output data is produced, it is transmitted over the MIN 110, and stored in the inpipe of another process or module. Output pipe declarations appear as follows in the preferred SilverC embodiment (Example 10):

outpipe<elementType>outpipeName;

As with the input pipe declaration, the elementType indicates the type of element that is transferred through the output pipe. An output pipe declaration that would complement the input pipe shown earlier would be declared as follows (Example 11):

outpipe<fract16>dataOut;

Input and output pipes both support two main types of operations: readiness checks, for the HTM 810 to determine if the task is ready to run, and synchronization. Output pipes also support assignments, which correspond to placing data on the network. Input pipes currently do not support direct access in the preferred SilverC embodiment, but must be accessed via SilverC pointers (to memory 845).

Data is written to an output pipe using a simple assignment. The right-hand side expression of the assignment must be of the same type as the element type of the pipe, or of a type that can automatically be coerced into the output type of the pipe. For example, the following code fragment would write the value 0.5 to the fract16 output pipe declared above, three times (Example 12):

```
// code to write 0.5 three times to the output pipe declared
    above
fract32 quarter = 0.25;
fract16 half = 0.5;
dataOut = 0.5;
dataOut = half;
dataOut = 2.0 * quarter;
...
```

Assuming that the downstream input pipe contains sufficient space, these assignments of Example 12 would cause the value 0.5 to be written into the next three available slots in the input buffer of the downstream input pipe, i.e., execution of this assignment statement would cause this data to be provided to the specified output port and onto the MIN 110, to be provided to the specified input port and corresponding memory 845 for the next consuming task. If three slots were not available, this program would overwrite old data, resulting in an incorrect program. To avoid such conditions, the readiness condition of the output pipe can be checked, as described in greater detail below.

Once data has been written to an output pipe, a synchronization message should be sent to the corresponding input pipe to let it know that new data has been written to its input buffer for a consuming task. This downstream notification functionality is provided by using the a notify( ) routine of the preferred SilverC embodiment, as follows (Example 13):

void notify(outpipe outpipeName, int16 numberOfElementsWritten);

In this Example 13, void indicates that there will be no return value from this routine call, outpipeName is the output pipe identifier, while numberOfElementsWritten indicates the number of new values that have been produced, and will be utilized in modifying the producer count held in the producer count table (PCT) of the producing node's HTM, and the consumer count held in the consumer count table (CCT) of the consuming node's HTM 810. For example, the consuming node's HTM 810 will check the CCT to determine that the consumer count has been increased to a predetermined value for a given task, and if so, will then trigger that consuming task by placing it in the ready-to-run queue.

Having written the three values shown in the above Example 12, the following call would tell its linked input pipe that three values had been written to its input buffer (Example 14):

```
// code to inform linked input pipe that 3 values written to its
    buffer...
notify(dataOut, 3);
```

The preferred SilverC embodiment does not prevent a user notification from providing incorrect information about how many values have actually been written to an input pipe buffer, although this usage is strongly discouraged. The value passed to a notify call should be equal to the number of assignments made to the output pipe since the preceding call. In addition, the synchronization used to implement the notify routine usually has a certain amount of overhead associated with it, which is why notifications are not assumed to be performed automatically by the runtime system for each assignment to an output pipe.

Correspondingly for data consumption, once a process associated with an input pipe has finished processing some portion of its buffered values, it must synchronize with the upstream output pipe to let it know that those slots are once again available for writing new values. The preferred SilverC embodiment utilizes a release( ) routine to provide this upstream notification functionality, as illustrated in the following code (Example 15):

void release(inpipe inpipeName, int16 numberOfElementsRead);

In this Example 15, void also indicates that there will be no return value from this routine call, inpipeName is the identifier of the input pipe while numberOfElementsRead indicates the number of elements in the input buffer that the consumer process wants to make available to the output pipe for subsequent writing by the producing process, and will be utilized in modifying the consumer count held in the consumer count table (CCT) of the consuming node's HTM, and the producer count held in the producer count table (PCT) of the producing node's HTM 810. For example, the producing node's HTM 810 will check the PCT to determine that the producer count has been decremented to or below a predetermined value for a given task and if so, will then trigger that producing task by placing it in the ready-to-run queue.

For example, if a process had read the three 0.5 values written in the output pipe of Example 12 above and would not be utilizing those data items again, it would indicate that it was done with them using the following call (Example 16):

```
// code to read three values from the dataIn buffer...
release(dataIn, 3);
```

As may be apparent from the discussion above, the synchronization functionality provided by the notify( ) and release( ) routines are mapped (through a compiler) directly to the functionality of the HTM 810 with its producer and consumer count tables, and correspondingly modify the CCT and PCT registers of the HTM 810 for each corresponding input or output port.

The preferred SilverC embodiment supports a query and initialization functionality, ready( ), which allows a process (program) to query whether input and output pipes are ready for data to be read from them or written to them. As discussed in greater detail below, in conjunction with specification of firing (execution) conditions as part of process definitions, these functionalities have the effect of initializing the CCT and PCT to their triggering values (firing or execution conditions), i.e., the values which will cause the HTM 810 to place the corresponding task in the ready-to-run queue for execution. The exemplary query function is illustrated using the following code (Example 17):

int16 ready(pipeType pipeName, int16 numberOfElements);

In this Example 17, pipeType is a placeholder to indicate that either an inpipe or outpipe can be used with this routine. The pipeName argument is the name of the pipe to be checked, while numberOfElements indicates the number of elements to be checked for (as a necessary and/or sufficient condition for triggering the corresponding task). For an input pipe, this routine indicates whether at least numberOfElements data values are ready to be read from the pipe input buffer. For an output pipe, it indicates whether there are numberOfElements slots available for writing new values in the corresponding input pipe buffer. The routine returns a first value (0) if the readiness condition of the pipe is not met, and a second value (non-zero) otherwise.

The readiness of a pipe does not correspond to the number of actual values written to or read from an input pipe buffer, but rather the number of elements that have been cumulatively specified by the notify( ) and release( ) synchronization routines. For example, if three values were written to an output pipe, but no notification was ever made that these three values had been written (and, as a consequence, the producer and consumer counts are unchanged), the following call would return 0 for the corresponding input pipe, even though the values may very well be stored in its buffer (Example 18):

ready(dataIn, 3) . . .

To be explicit, assuming that an output pipe O is connected to an input pipe I whose buffer size is b, that n elements in total have been notified for O and that r elements have been released from I during the execution of the program, and that k open buffer elements (slots) are required for writing to memory (output) and d elements are required for reading from memory (input), then the calls to ready( ) would be defined as follows in the preferred SilverC embodiment (Example 19):

ready(O, k): returns non-zero (true) if $(b-n)+r \geq k$; otherwise returns 0 (false)

ready(I, d): returns non-zero if $n-r > d$; otherwise returns 0

Conditional statements may also be utilized in the preferred SilverC embodiment, for example, to ensure that the three writes to the output pipe of Example 12 do not overwrite data values that they should not, such as (Example 20):

```
fract16 half = 0.5;
fract32 quarter = 0.25;
if (ready(dataOut, 3)) {
    dataOut = 0.5;
    dataOut = half;
    dataOut = 2.0 * quarter;
    notify(dataOut, 3);
}
```

Conceptually in this Example 20, if the input memory has sufficient space to accommodate the writing of three new values, then the data will be written to the corresponding output ports, and the consuming task will be correspondingly notified.

Such pipe readiness is typically checked or determined within the firing conditions of a process, as described below.

In the preferred SilverC embodiment, the processes section of a module contains the process (method or program) definitions that define a module. A module may consist of one or more processes, which are cooperatively multitasked with each other, as well as with any other modules mapped to the same AEU 840 or other form of hardware computational element. Each such process corresponds to a task to be performed on a node 150, 800.

In the preferred SilverC embodiment, processes are where the bulk of the program behavior is defined and where most of the C-style code appears. Process declarations vaguely resemble C-style functions, but due to their adaptive computing nature, they take no parameters and have no return type. Instead, they are defined with associated firing conditions that indicate when the process should run (typically in terms of the readiness of one or more input and/or output pipes).

The general pattern for defining a process is as follows (Example 20):

```
process processName when firingCondition {
    ...
}
```

In this exemplary process definition, processName is a unique identifier for the process and firingCondition indicates the condition that must be true in order for the process (corresponding task) to be executed. This is typically the logical AND of a number of pipe readiness conditions and, as indicated above, initializes the PCT and CCT values.

As an example, the following code declares a process for a sample module named passThrough. It is declared to fire whenever its input pipe has a block of values (of size blockSize) ready for reading and its output pipe has a block of locations (also in this example of size blockSize) free for writing (Example 21):

```
module Sample<const int16 blockSize> {
    ...
    processes:
        process passThrough when (ready(dataIn, blockSize) &&
                                  ready(dataOut, blockSize)) {
```
```
            ...
        }
}
```

The body of a process is preferably made up of SilverC code as it has been described, namely, traditional C or C++ language program constructs augmented with SilverC constructs, definitions, extensions, pointers, and pipe operations. The body of a process may alternately contain inline C or assembly code. Preferably, most processes begin by firing based on the readiness of their input and output pipes, perform some computations using the input data and module state, followed by assigning the results to their output pipes, and then performing notification and release calls on the pipes.

For a comparatively simple example, a process is declared such that it effectively copies data values from its input pipe to its output pipe without changing them, as illustrated in the following exemplary code (Example 22):

```
module Sample<const int16 blockSize> {
    ...
    processes:
        process passThrough when (ready(dataIn, blockSize) &&
                                  ready(dataOut, blockSize)) {
            static pointer<fract16, dataIn, 1> dataInPtr;
            int16 i;
            for (i=0; i<blockSize; i++) {
                dataOut = *(dataInPtr++);
            }
            notify(dataOut, blockSize);
            release(dataIn, blockSize);
        }
}
```

This process runs whenever a block of values (of size blockSize) is ready for reading from its input, and a block of locations (of size blockSize) are ready for writing on its output, as the firing conditions which initialize the CCT and PCT of the HTM 810. It proceeds by running a SilverC pointer (dataInPtr++) incrementally, one element at a time, across that input block of values (in a buffer corresponding to dataIn), and writing them to its output pipe. This process then notifies the downstream pipe that it has sent a block of values to it, and releases the input values so that the upstream process may overwrite them, modifying the values held in the CCT and PCT. It should be noted that these synchronization calls notify( ) and release( ) could be performed in any order, with the choice of order depending on which message should be delivered first.

Once SilverC modules have been defined in accordance with the present invention, they may be used as a new parameterized type in the language of the preferred SilverC embodiment. Declaring "variables" of these types corresponds to creating a new instantiation of the module that executes in parallel with all other module instantiations. For example, given a module definition as follows (Example 23):

```
module Sample<const int16 blockSize> {
    ...
}
``` then an instantiation of the module with a blockSize parameter of "8" would appear as:

Sample<8>mySampleModule;

It should be noted that the number and types of parameters specified during the module instantiation must match the parameters declared for the module. In addition, a module may be instantiated more than once.

In order for modules to function to produce desired results, the preferred SilverC embodiment provides for input and output pipes of a module to be linked to the output and input pipes of other modules. This linking or connecting of pipes across modules may be performed statically or dynamically, and may be implemented repeatedly with different linking connections, such as linking "A" to "B" at one instant, followed by linking "A" to "C" at another instant. The preferred SilverC embodiment utilizes a link( ) function, which may be specified as (Example 24):

void link(outpipe<elementType>, inpipe<elementType, bufferSize>);

Also in the preferred SilverC embodiment, a main( ) function is utilized to instantiate modules and their corresponding links to each other.

The element types of both pipes should match one another. In this context, pipes are referred to using the identifier of the module instantiation followed by a dot (.), followed by the name of the pipe as declared within the module definition.

As an example, the following exemplary code fragment illustrates module definition, pipe definition, module instantiation and pipe linking (Example 25):

```
module Producer<const int16 outBlockSize> {
    pipes:
        outpipe<fract16> dataOut;
        ...
}
module Consumer<const int16 inBlockSize> {
    pipes:
        inpipe<fract16, 2*inBlockSize> dataIn;
        ...
}
void main( ) {
    const int16 bufferSize = 32;
    Producer<bufferSize> myProducer;
    Consumer<bufferSize> myConsumer;
    link(myProducer.dataOut, myConsumer.dataIn);
    ...
}
```

Instantiating modules using the main ( ) function, this code declares an instance of each of the Producer and Consumer modules, as myProducer and myConsumer, respectively, similarly to the C++ declaration of an object as an instance of a class. This Example 25 then links the output pipe of the instantiated producer, dataOut, to the input pipe of the instantiated consumer, dataIn.

The language constructs of the preferred SilverC embodiment directly support the static and dynamic reconfiguration capabilities of the ACE (ACM) 100 hardware. In particular, the SilverC module, process and pipe constructs are an efficient means to specify the static and dynamic reconfiguration parameters of the ACE (ACM) 100 MIN 110 and node 800 Hardware Task Manager 810.

With regard to the static or dynamic reconfiguration of the MIN 110 of the ACE (ACM) 100, as mentioned above, the following information is required for configuration: a source node identifier; a source task identifier; a source port identifier; a destination node identifier; a destination task identifier; and a destination port identifier. The preferred SilverC embodiment provides the following direct mapping from the programming language domain to the ACE (ACM) 100 hardware domain:

f(module, process, pipe)=(node id, task id, port id)

The SilverC module constructs provides a direct mapping from the programming language domain to the ACE (ACM) 100 node identifier domain. The SilverC compiler assigns module instances to ACE (ACM) 100 nodes according to the node type specified in the module definition and any additional constraints applied to the module instance.

The SilverC process construct provides a direct mapping from the programming language domain to the ACE (ACM) 100 task identifier domain. A unique task identifier is generated for each process of each module instance.

The SilverC pipe construct provides a direct mapping from the programming language domain to the ACE (ACM) 100 port identifier domain. A unique unit port identifier is generated for each port of each module instance.

The SilverC link( ) function provides the association between source node, task and port identifiers and destination node, task and port identifiers. It provides a direct mapping from the programming language domain to the MIN 110 connection domain of the ACE (ACM) 100.

With regard to the static or dynamic reconfiguration of the HTM 810 of a node 800, as discussed above, the following information is required for configuration: a task identifier; the number of input and output ports utilized by a task; and a pair of counter values for each port (initial and triggering values). The SilverC programming language provides the following direct mapping from the programming language domain to the ACE (ACM) 100 hardware domain:

f(process)=(inputs, {input counters}, outputs, {output counters})

As described above, the SilverC process construct provides a direct mapping from the programming language domain to the ACE (ACM) 100 task identifier domain. A unique task identifier is generated for each process of each module instance.

The SilverC ready( ) function provides a direct mapping from the programming language domain to the HTM firing condition domain. The HTM Consumer Count Table (CCT) and Producer Count Table (PCT) are populated using the counter values specified in the ready( ) function. The SilverC module construct plays an indirect role in this mapping, as it provides the association between processes and pipes. The SilverC pipe construct also provides an indirect role as it provides the mapping to MIN 110 ports, as described above.

The SilverC pipe construct provides a direct mapping from the programming language domain to the HTM initial counter value domain. For an exemplary SilverC inpipe, the initial counter value for the corresponding input port is simply—bufferSize, where bufferSize is size of the inpipe buffer as specified in its declaration. For an exemplary SilverC outpipe, the initial counter value for the corresponding output port is—(bufferSize−readyCount+1), where bufferSize is size of the buffer of the inpipe that is linked to this outpipe through a link( ) expression, and readyCount is the firing condition associated with the output port through a ready( ) expression. The release( ) and notify( )constructs may then be utilized to increment or decrement the counter values held in the corresponding CCT and PCT of the HTM 810.

The system, methods and programs of the present invention may be embodied in any number of forms, such as within a computer, within a workstation, within a computer network, within an adaptive computing device such as an ACE 100, or within any other form of computing or other system used to create or contain source code. Such source code further may be compiled into some form of instructions or object code (including assembly language instructions or configuration information for adaptive computing). The source code of the present invention may be embodied as any type of software, such as C++, C#, Java, or any other type of programming language which performs the functionality discussed above, including the preferred SilverC embodiment. The source code of the present invention and any resulting bit file (object code or configuration bit sequence) may be embodied within any tangible storage medium, such as within a memory or storage device for use by a computer, a workstation, any other machine-readable medium or form, or any other storage form or medium for use in a computing system. Such storage medium, memory or other storage devices may be any type of memory device, memory integrated circuit ("IC"), or memory portion of an integrated circuit (such as the resident memory within a processor IC), including without limitation RAM, FLASH, DRAM, SRAM, MRAM, FeRAM, ROM, EPROM or $E^2$PROM, or any other type of memory, storage medium, or data storage apparatus or circuit, depending upon the selected embodiment. For example, without limitation, a tangible medium storing computer readable software, or other machine-readable medium, may include a floppy disk, a CDROM, a CD-RW, a magnetic hard drive, an optical drive, or a quantum computing storage medium or device.

In summary, the present invention provides a system, software, and method for programming an adaptive computing device which has a plurality of heterogeneous nodes coupled through a matrix interconnect network. The method embodiment comprises, in any order: creating a first program construct having a correspondence to a selected node of the plurality of heterogeneous nodes; creating a second program construct having a correspondence to an executable task of the selected node; creating a third program construct having a correspondence to at least one input port coupling the selected node to the matrix interconnect network for input data to be consumed by the executable task; and creating a fourth program construct having a correspondence to at least one output port coupling the selected node to the matrix interconnect network for output data to be produced by the executable task.

In the preferred SilverC embodiment, the first program construct is a module declaration, optionally having a first unique identifier, a first reference to a node type corresponding to the selected node, and a second reference to one or more configuration-time parameters. The preferred module declaration has a form comprising:

[nodeType] module moduleName [<parameterList>], in which nodeType is a placeholder for the first reference to the node type corresponding to the selected node, moduleName is a placeholder for the first unique identifier, and parameterList is a placeholder for the second reference to one or more configuration-time parameters.

It should be noted that to be functional when compiled into configuration information, this first program construct generally includes, within the body of the construct, the second, third and fourth program constructs. The function of the first program construct, however, is merely to map or correspond to a node type.

In the preferred SilverC embodiment, as additional options, the module declaration further has a constants section which declares at least one constant which is global to the module; a states section which declares shared state information between module processes (such as an array of values stored in a memory); a process section having one or more process declarations, as second program constructs; and a pipes section, the pipes section having the third program construct and the fourth program construct.

The third program construct is preferably an inpipe declaration having a first unique identifier and further having a first parameter specifying an element type of the input data and a second parameter specifying an amount of memory to be reserved for the input data; and the fourth program construct is preferably an outpipe declaration having a second unique identifier and further having a third parameter specifying an element type of the output data. An assignment of output data to the outpipe declaration corresponds to writing output data to the output port connecting the node 800 to the MIN 100.

The inpipe declaration preferably has a form comprising:

inpipe<elementType1, bufferSize>inpipeName;

in which elementType1 is a placeholder for the first parameter specifying the element type of the input data, bufferSize is a placeholder for the second parameter specifying the amount of memory to be reserved for the input data, and inpipeName is a placeholder for the first unique identifier. The outpipe declaration preferably has a form comprising:

outpipe<elementType2>outpipeName;

in which elementType2 is a placeholder for the third parameter specifying the element type of the output data, and outpipeName is a placeholder for the second unique identifier.

In the preferred SilverC embodiment, the second program construct is a process declaration having a unique identifier and having at least one firing condition, the firing condition capable of determining a commencement of the executable task of the selected node. The process declaration preferably has a form comprising:

```
process processName when firingCondition {
    ...
}
``` in which processName is placeholder for the unique identifier, firingCondition is a placeholder for a condition to be fulfilled in order to commence performance of the executable task, and the ellipsis " . . . " is a placeholder for specification of one or more functions or algorithmic elements comprising the executable task.

Synchronization of production of output data with consumption of input data is provided by creating a fifth program construct corresponding to a data producing task notifying a data consuming task of the creation of output data; and creating a sixth program construct corresponding to a data consuming task notifying a data producing task of the consumption of input data. In addition to potentially being on the same node, in some instances, the data producing task is executable on a first node of the plurality of heterogeneous nodes and the data consuming task is executable on a second node of the plurality of heterogeneous nodes.

In the preferred SilverC embodiment, the fifth program construct is a notify routine and has a form comprising:

notify(outpipeName, numberOfElementsWritten);

wherein outpipeName is a placeholder for a first unique identifier of the fourth program construct and numberOfElementsWritten is a placeholder for an amount of output data produced. Also in the preferred SilverC embodiment, the sixth program construct is a release routine and has a form comprising:

release(inpipeName, numberOfElementsRead);

wherein inpipeName is a placeholder for a second unique identifier of the third program construct and numberOfElementsRead is a placeholder for an amount of input data consumed.

The present invention also provides for commencement of the executable task through a seventh program construct having a correspondence to a task manager of the selected node, which may be used to and corresponds to an initialization of a producer count table of the task manager or an initialization of a consumer count table of the task manager. In the preferred SilverC embodiment, the seventh program construct is a ready routine and has a form comprising:

ready(pipeName, numberOfElements);

wherein pipeName is a placeholder for a unique identifier of either the third program construct or the fourth program construct and numberOfElements is a placeholder for an amount of data which is sufficient for commencement of the executable task.

An eighth program construct is used to link the fourth program construct to the third program construct, and corresponds to a selected configuration of the matrix interconnection network to provide a communication path from a selected output port to a selected input port. In the preferred SilverC embodiment, the eighth program construct is a link routine and has a form comprising:

link(outpipe, inpipe);

wherein outpipe is a placeholder for a first unique identifier of an instantiation of a first program construct and a fourth program construct, of a plurality of instantiations, and inpipe is a placeholder for a second unique identifier of an instantiation of a first program construct and a third program construct, of the plurality of instantiations.

A ninth program construct may also be utilized to instantiate a program construct of a plurality of program constructs, such as the first program construct, the second program construct, the third program construct, the fourth program construct, and the eighth program construct. In the preferred SilverC embodiment, the ninth program construct is a main function and has a form comprising:

```
main( ) {
...
}
``` wherein the ellipsis " . . . " is a placeholder for specification of a program construct to be instantiated. For example, the main( ) function can be utilized to instantiate a module, with all of its incorporated program constructs such as processes, pipes, and links. In addition, different module and other program construct parameters will allow different instantiations of modules and their included constructs, as mentioned above, such that each instantiation corresponds to a parameter set contained within the program construct.

Numerous advantages of the present invention may be readily apparent. The invention facilitates static and dynamic configuration of an adaptive computing device such as the ACE 100. While applicable to many hardware platforms and programming styles, it contains several constructs that directly support the static or dynamic reconfiguration of the MIN 110 and HTMs 810 of the ACE (ACM) 100.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

The invention claimed is:

1. A method for programming an adaptive computing device, the adaptive computing device having a plurality of heterogeneous nodes coupled through a matrix interconnect network, the method comprising:
   creating a first program construct having a correspondence to a selected node of the plurality of heterogeneous nodes;
   creating a second program construct having a correspondence to an executable task of the selected node;
   creating a third program construct having a correspondence to at least one input port coupling the selected node to the matrix interconnect network for input data to be consumed by the executable task;
   creating a fourth program construct having a correspondence to at least one output port coupling the selected node to the matrix interconnect network for output data to be produced by the executable task;
   providing for synchronization of production of output data with consumption of input data by:
      creating a fifth program construct corresponding to a data producing task notifying a data consuming task of the creation of output data; and
      creating a sixth program construct corresponding to a data consuming task notifying a data producing task of the consumption of input data;
   providing for commencement of the executable task by creating a seventh program construct having a correspondence to a task manager of the selected node;
wherein the seventh program construct is a ready routine and has a form comprising:
   ready (pipeName, numberOfElements);
      wherein pipeName is a placeholder for a unique identifier of either the third program construct or the fourth program construct and numberOfElements is a placeholder for an amount of data which is sufficient for commencement of the executable task;
   compiling the created program constructs; and
   executing the compiled program constructs to program the adaptive computing device.

2. The method of claim 1 wherein the first program construct is a module declaration having a first unique identifier and further having a first reference to a node type corresponding to the selected node.

3. The method of claim 2 wherein the module declaration further has a second reference to one or more configuration-time parameters.

4. The method of claim 3 wherein the module declaration further has a form comprising:

[nodeType] module moduleName[<parameterList>], in which nodeType is a placeholder for the first reference to the node type corresponding to the selected node, moduleName is a placeholder for the first unique identifier, and parameterList is a placeholder for the second reference to one or more configuration-time parameters.

5. The method of claim 2 wherein the module declaration further has a constants section which declares at least one constant which is global to the module.

6. The method of claim 2 wherein the module declaration further has a states section which declares shared state information between module processes.

7. The method of claim 6 wherein the shared state information contains an array of values stored in a memory.

8. The method of claim 2 wherein the module declaration further has a pipes section, the pipes section having the third program construct and the fourth program construct.

9. The method of claim 1 wherein the third program construct is an inpipe declaration having a first unique identifier and further having a first parameter specifying an element type of the input data and a second parameter specifying an amount of memory to be reserved for the input data; and wherein the fourth program construct is an outpipe declaration having a second unique identifier and further having a third parameter specifying an element type of the output data.

10. The method of claim 9 wherein an assignment of output data to the outpipe declaration corresponds to writing output data to the output port.

11. The method of claim 9 wherein the inpipe declaration further has a form comprising:
  inpipe<elementType1, bufferSize>inpipeName;
in which elementType1 is a placeholder for the first parameter specifying the element type of the input data, bufferSize is a placeholder for the second parameter specifying the amount of memory to be reserved for the input data, and inpipeName is a placeholder for the first unique identifier; and wherein the outpipe declaration further has a form comprising:
  outpipe<elementType2>outpipeName;
in which elementType2 is a placeholder for the third parameter specifying the element type of the output data, and outpipeName is a placeholder for the second unique identifier.

12. The method of claim 1 wherein the second program construct is a process declaration having a unique identifier and having at least one firing condition, the firing condition capable of determining a commencement of the executable task of the selected node.

13. The method of claim 12 wherein the process declaration further has a form comprising:
  process processName when firingCondition {
  . . .
  }
in which processName is placeholder for the unique identifier, firingCondition is a placeholder for a condition to be fulfilled in order to commence performance of the executable task, and the ellipsis " . . . " is a placeholder for specification of one or more functions or algorithmic elements comprising the executable task.

14. The method of claim 1 wherein either the data producing task is executable on a first node of the plurality of heterogeneous nodes and the data consuming task is executable on a second node of the plurality of heterogeneous nodes or both the data producing task and the data consuming task are executable on a same node of the plurality of heterogeneous nodes.

15. The method of claim 1 wherein the fifth program construct is a notify routine and has a form comprising:
  notify (outpipeName, numberOfElementsWritten);
wherein outpipeName is a placeholder for a first unique identifier of the fourth program construct and numberOfElementsWritten is a placeholder for an amount of output data produced; and wherein the sixth program construct is a release routine and has a form comprising:
  release (inpipeName, numberOfElementsRead);
wherein inpipeName is a placeholder for a second unique identifier of the third program construct and numberOfElementsRead is a placeholder for an amount of input data consumed.

16. The method of claim 1 wherein the seventh program construct further corresponds to an initialization of a producer count table of the task manager.

17. The method of claim 1 wherein the seventh program construct further corresponds to an initialization of a consumer count table of the task manager.

18. The method of claim 1, further comprising:
  creating an eighth program construct linking the fourth program construct to the third program construct, the eighth program construct corresponding to a selected configuration of the matrix interconnection network providing a communication path from a selected output port to a selected input port.

19. The method of claim 18 wherein the eighth program construct is a link routine and has a form comprising:
  link(outpipe, inpipe);
wherein outpipe is a placeholder for a first unique identifier of an instantiation of a first program construct and a fourth program construct, of a plurality of instantiations, and inpipe is a placeholder for a second unique identifier of an instantiation of a first program construct and a third program construct, of the plurality of instantiations.

20. The method of claim 18, further comprising:
  creating a ninth program construct to instantiate a program construct of a plurality of program constructs, the plurality of program constructs comprising the first program construct, the second program construct, the third program construct, the fourth program construct, and the eighth program construct.

21. The method of claim 20 wherein the ninth program construct is a main function and has a form comprising:
  main( ) {
  . . .
  }
wherein the ellipsis " . . . " is a placeholder for specification of a program construct to be instantiated.

22. The method of claim 20, wherein an instantiation corresponds to a parameter set contained within the program construct.

23. A tangible medium storing computer readable software for programming an adaptive computing device, the adaptive computing device having a plurality of heterogeneous nodes coupled through a matrix interconnect network, the tangible medium storing computer readable software comprising:
  a first program construct having a correspondence to a selected node of the plurality of heterogeneous nodes;
  a second program construct having a correspondence to an executable task of the selected node;
  a third program construct having a correspondence to at least one input port coupling the selected node to the matrix interconnect network for input data to be consumed by the executable task;
  a fourth program construct having a correspondence to at least one output port coupling the selected node to the matrix interconnect network for output data to be produced by the executable task;

a fifth program construct corresponding to a data producing task notifying a data consuming task of the creation of output data;

a sixth program construct corresponding to a data consuming task notifying a data producing task of the consumption of input data;

wherein the fifth program construct and the sixth program construct provide for synchronization of production of output data with consumption of input data;

a seventh program construct having a correspondence to a task manager of the selected node to provide for commencement of the executable task;

wherein the seventh program construct is a ready routine and has a form comprising:

ready (pipeName, numberOfElements):

wherein pipeName is a placeholder for a unique identifier of either the third program construct or the fourth program construct and numberOfElements is a placeholder for an amount of data which is sufficient for commencement of the executable task; and wherein the program constructs are compiled and executed to program the adaptive computing device.

24. The tangible medium storing computer readable software of claim 23 wherein the first program construct is a module declaration having a first unique identifier and further having a first reference to a node type corresponding to the selected node.

25. The tangible medium storing computer readable software of claim 24 wherein the module declaration further has a second reference to one or more configuration-time parameters.

26. The tangible medium storing computer readable software of claim 25 wherein the module declaration further has a form comprising:

[nodeType] module moduleName[<parameterList>], in which nodeType is a placeholder for the first reference to the node type corresponding to the selected node, moduleName is a placeholder for the first unique identifier, and parameterList is a placeholder for the second reference to one or more configuration-time parameters.

27. The tangible medium storing computer readable software of claim 24 wherein the module declaration further has a constants section which declares at least one constant which is global to the module.

28. The tangible medium storing computer readable software of claim 24 wherein the module declaration further has a states section which declares shared state information between module processes.

29. The tangible medium storing computer readable software of claim 28 wherein the shared state information contains an array of values stored in a memory.

30. The tangible medium storing computer readable software of claim 24 wherein the module declaration further has a pipes section, the pipes section having the third program construct and the fourth program construct.

31. The tangible medium storing computer readable software of claim 23 wherein the third program construct is an inpipe declaration having a first unique identifier and further having a first parameter specifying an element type of the input data and a second parameter specifying an amount of memory to be reserved for the input data; and wherein the fourth program construct is an outpipe declaration having a second unique identifier and further having a third parameter specifying an element type of the output data.

32. The tangible medium storing computer readable software of claim 31 wherein an assignment of output data to the outpipe declaration corresponds to writing output data to the output port.

33. The tangible medium storing computer readable software of claim 31 wherein the inpipe declaration further has a form comprising:

inpipe<elementType1, bufferSize>inpipeName;

in which elementType1 is a placeholder for the first parameter specifying the element type of the input data, bufferSize is a placeholder for the second parameter specifying the amount of memory to be reserved for the input data, and inpipeName is a placeholder for the first unique identifier; and wherein the outpipe declaration further has a form comprising:

outpipe<elementType2>outpipeName;

in which elementType2 is a placeholder for the third parameter specifying the element type of the output data, and outpipeName is a placeholder for the second unique identifier.

34. The tangible medium storing computer readable software of claim 23 wherein the second program construct is a process declaration having a unique identifier and having at least one firing condition, the firing condition capable of determining a commencement of the executable task of the selected node.

35. The tangible medium storing computer readable software of claim 34 wherein the process declaration further has a form comprising:

process processName when firingCondition {
. . .
} in which processName is placeholder for the unique identifier, firingCondition is a placeholder for a condition to be fulfilled in order to commence performance of the executable task, and the ellipsis " . . . " is a placeholder for specification of one or more functions or algorithmic elements comprising the executable task.

36. The tangible medium storing computer readable software of claim 23 wherein either the data producing task is executable on a first node of the plurality of heterogeneous nodes and the data consuming task is executable on a second node of the plurality of heterogeneous nodes or both the data producing task and the data consuming task are executable on a same node of the plurality of heterogeneous nodes.

37. The tangible medium storing computer readable software of claim 23 wherein the fifth program construct is a notify routine and has a form comprising:

notify (outpipeName, numberOfElementsWritten);

wherein outpipeName is a placeholder for a first unique identifier of the fourth program construct and numberOfElementsWritten is a placeholder for an amount of output data produced; and wherein the sixth program construct is a release routine and has a form comprising:

release (in pipeName, numberOfElementsRead);

wherein inpipeName is a placeholder for a second unique identifier of the third program construct and numberOfElementsRead is a placeholder for an amount of input data consumed.

38. The tangible medium storing computer readable software of claim 23 wherein the seventh program construct further corresponds to an initialization of a producer count table of the task manager.

39. The tangible medium storing computer readable software of claim 23 wherein the seventh program construct further corresponds to an initialization of a consumer count table of the task manager.

40. The tangible medium storing computer readable software of claim 23, further comprising:
   an eighth program construct linking the fourth program construct to the third program construct, the eighth program construct corresponding to a selected configuration of the matrix interconnection network providing a communication path from a selected output port to a selected input port.

41. The tangible medium storing computer readable software of claim 40 wherein the eighth program construct is a link routine and has a form comprising:
   link(outpipe, inpipe);
wherein outpipe is a placeholder for a first unique identifier of an instantiation of a first program construct and a fourth program construct, of a plurality of instantiations, and inpipe is a placeholder for a second unique identifier of an instantiation of a first program construct and a third program construct, of the plurality of instantiations.

42. The tangible medium storing computer readable software of claim 40, further comprising:
   a ninth program construct to instantiate a program construct of a plurality of program constructs, the plurality of program constructs comprising the first program construct, the second program construct, the third program construct, the fourth program construct, and the eighth program construct.

43. The tangible medium storing computer readable software of claim 42 wherein the ninth program construct is a main function and has a form comprising:
   main( ) {
   . . .
   }
wherein the ellipsis " . . . " is a placeholder for specification of a program construct to be instantiated.

44. The tangible medium storing computer readable software of claim 42 wherein an instantiation corresponds to a parameter set contained within the program construct.

45. A system, having a processor, for programming an adaptive computing device, the adaptive computing device having a plurality of heterogeneous nodes coupled through a matrix interconnect network, the system comprising:
   means for defining a first program construct having a correspondence to a selected node of the plurality of heterogeneous nodes;
   means for defining a second program construct having a correspondence to an executable task of the selected node, the second program construct having at least one firing condition capable of determining a commencement of the executable task of the selected node;
   means for defining a third program construct having a correspondence to at least one input port coupling the selected node to the matrix interconnect network for input data to be consumed by the executable task;
   means for defining a fourth program construct having a correspondence to at least one output port coupling the selected node to the matrix interconnect network for output data to be produced by the executable task;
   means for defining a fifth program construct having a correspondence to a notification of creation of output data, and means for a sixth program construct having a correspondence to a notification of consumption of input data; wherein the fifth program construct and the sixth program construct provide for synchronization of production of output data with consumption of input data;
   means for defining a seventh program construct having a correspondence to a task manager of the selected node to provide for commencement of the executable task, wherein the means for the seventh program construct further has correspondence to an initialization of a producer count table of the task manager or a consumer count table of the task manager;
   means for defining an eighth program construct linking the fourth program construct to the third program construct, the eighth program construct corresponding to a selected configuration of the matrix interconnection network providing a communication path from a selected output port to a selected input port
   means for compiling the defined program constructs; and
   means for executing the compiled program constructs to program the adaptive computing device.

46. The system of claim 45, further comprising:
   means for defining a ninth program construct to instantiate a program construct of a plurality of program constructs, the plurality of program constructs comprising at least the first program construct, the second program construct, the third program construct, the fourth program construct, and the eighth program construct.

47. The system of claim 46, an instantiation corresponds to a parameter set contained within the program construct.

* * * * *